(12) United States Patent
Lura et al.

(10) Patent No.: US 11,313,804 B2
(45) Date of Patent: Apr. 26, 2022

(54) FLUID SENSOR APPARATUS

(71) Applicant: Medtronic, Inc., Minneapolis, MN (US)

(72) Inventors: David B. Lura, Maple Grove, MN (US); Shawn Kelley, Shoreview, MN (US); Martin T. Gerber, Maple Grove, MN (US)

(73) Assignee: Medtronic, Inc, Minneapolis, MN (US)

( * ) Notice: Subject to any disclaimer, the term of this patent is extended or adjusted under 35 U.S.C. 154(b) by 200 days.

(21) Appl. No.: 15/677,261

(22) Filed: Aug. 15, 2017

(65) Prior Publication Data

US 2018/0073991 A1    Mar. 15, 2018

Related U.S. Application Data

(60) Provisional application No. 62/385,946, filed on Sep. 9, 2016.

(51) Int. Cl.
| | | |
|---|---|---|
| *G01N 21/80* | (2006.01) | |
| *G01N 21/78* | (2006.01) | |
| *G01N 21/64* | (2006.01) | |
| G01N 21/77 | (2006.01) | |

(52) U.S. Cl.
CPC ......... *G01N 21/80* (2013.01); *G01N 21/6428* (2013.01); *G01N 21/78* (2013.01); *G01N 21/783* (2013.01); *G01N 2021/7763* (2013.01); *G01N 2201/062* (2013.01); *G01N 2201/0627* (2013.01)

(58) Field of Classification Search
CPC .... G01N 21/80; G01N 21/78; G01N 21/6428; G01N 2201/062; G01N 21/783; G01N 2201/0627; G01N 2021/7763; A61M 1/1601; A61M 2205/3368; A61M 1/28; A61M 2205/3324; A61M 2205/3306
See application file for complete search history.

(56) References Cited

U.S. PATENT DOCUMENTS

| | | |
|---|---|---|
| 3,754,867 A | 8/1973 | Guenther |
| 3,989,625 A | 11/1976 | Mason |
| 4,661,246 A | 4/1987 | Ash |

(Continued)

FOREIGN PATENT DOCUMENTS

| | | |
|---|---|---|
| CA | 3006157 A1 | 1/2017 |
| CN | 1643368 A | 7/2005 |

(Continued)

OTHER PUBLICATIONS

European Search Report for App. No. 17190053.3, dated Jan. 2, 2018.

(Continued)

*Primary Examiner* — Samuel P Siefke

(57) ABSTRACT

The invention relates to a fluid sensor apparatus and a related sensor card for determining and/or monitoring a pH and/or solute concentration in a fluid. The fluid sensor apparatus can be used in any application requiring the detection of fluid components or concentrations of solutes, and in an exemplary embodiment, is used to detect ammonia concentration and/or pH in dialysis fluid. The fluid sensor apparatus has a camera, a light source positioned opposite to the camera, and a receiving slot for positioning a removable sensor card between the camera and the light source such that both sides of the sensor card are exposed to the sampled fluid.

15 Claims, 15 Drawing Sheets

(56) References Cited

U.S. PATENT DOCUMENTS

| | | |
|---|---|---|
| 4,772,560 A | 9/1988 | Attar |
| 5,091,642 A | 2/1992 | Chow |
| 2001/0048637 A1 | 12/2001 | Weigl |
| 2003/0113931 A1 | 6/2003 | Pan |
| 2005/0214863 A1 | 9/2005 | McDevitt |
| 2005/0265895 A1 | 12/2005 | Kopelman |
| 2007/0161113 A1 | 7/2007 | Ash |
| 2008/0200866 A1 | 8/2008 | Prisco |
| 2010/0061892 A1 | 3/2010 | Flaim |
| 2011/0081728 A1 | 4/2011 | Putnam |
| 2012/0135396 A1 | 5/2012 | McDevitt |
| 2014/0216250 A1 | 8/2014 | Meyer |
| 2014/0276100 A1 | 9/2014 | Satterfield |
| 2014/0314625 A1 | 10/2014 | Clift |
| 2018/0043080 A1 | 2/2018 | Gerber |

FOREIGN PATENT DOCUMENTS

| | | |
|---|---|---|
| CN | 101300476 A | 11/2008 |
| CN | 101400997 | 1/2009 |
| CN | 101482572 | 7/2009 |
| CN | 202048893 | 3/2011 |
| CN | 103439230 A | 9/2013 |
| CN | 103803479 | 5/2014 |
| CN | 104833635 A | 8/2015 |
| CN | 105115921 | 12/2015 |
| CN | 101644667 | 2/2020 |
| WO | WO 1998054563 | 12/1998 |
| WO | WO 20140121161 | 8/2014 |
| WO | WO 20150159280 | 10/2015 |

OTHER PUBLICATIONS

European Search Report for App. No. 17190066, dated Jan. 16, 2018.
European Search Report for App. No. 17190084, dated Feb. 9, 2018.
Wollenstein, et al, "Colorimetric gas sensors for the detection of ammonia, nitrogen dioxide, and carbon monoxide: current status and research trends", Sensor and Test Conference 2011, Jan. 2, 2011, pp. 562-567.
International Preliminary Report on Patentability for App. No. PCT/US2019/019334, dated Jun. 12, 2019.
Office Action in Chinese App. No. 201710778666.3 dated Sep. 19, 2019.
Chinese Office Action for App. No. 201710778666.3, dated Feb. 25, 2020.
Chinese Office Action for App. No. 201710778666.3, dated Jul. 15, 2020.
Chinese Office Action for App. No. 201710779349.3, dated Jun. 1, 2020.
Chinese Office Action for App. No. 201710779964.4, dated Aug. 26, 2020.
Chinese Office Action for App. No. 201710778666.3, dated Nov. 20, 2020.
Chinese Office Action for App. No. 201710779964.4, dated Apr. 14, 2020.
"Resources, environment and sustainable development of agriculture," edited by Liu Zhaopu, China Agricultural Science and Technology Press, pp. 209-211, Aug. 31, 1994.
"Rural Medical and Health Handbook," written by Shanghai "Rural Medical and Health Handbook Writing team, Shanghai Science and Technology Press, Jun. 1968, p. 435.
"Surface water environmental quality standard non-ionic ammonia conversion method," Teng Enjiang, et al, "China Environmental Monitoring," vol. 11, No. 4, pp. 7-9, Dec. 31, 1995.
European Search Report for App. No. 19764587.2, dated Nov. 18, 2021.

FLUID SENSOR APPARATUS

CROSS-REFERENCE TO RELATED APPLICATIONS

This application claims the benefit of and priority to U.S. Provisional Patent Application No. 62/385,946 filed Sep. 9, 2016, the entire disclosure of which is incorporated by reference herein.

FIELD OF THE INVENTION

The invention relates to a fluid sensor apparatus and a related sensor card for determining and/or monitoring a pH and/or solute concentration in a fluid. The fluid sensor apparatus can be used in any application requiring the detection of fluid components or concentrations of solutes, and in an exemplary embodiment, is used to detect ammonia concentration and/or pH in dialysis fluid. The fluid sensor apparatus has a camera, a light source positioned opposite to the camera, and a receiving slot for positioning a removable sensor card between the camera and the light source such that both sides of the sensor card are exposed to the sampled fluid.

BACKGROUND

To obtain quantitative sampling of solutes in a fluid, known systems and methods contact sensors with the fluid. Sensors for quantitative sampling of solutes in a fluid are important in a variety of fields, including automotive, medical, environmental, water and fluid analytics, quality control, consumer product, or chemical fields. The sensors commonly include materials having a variable output parameter depending on the amount of the measured solute in the sampled fluid. For example, an ammonia sensor used by known systems has a chemical substance that changes color or color intensity if exposed to ammonia. Typically, the systems and methods detect the measured solute by submersing the sensor in a static pool of fluid when measuring ammonia levels in a fish tank. For applications requiring continuous or intermittent measurement of flowing fluid, the systems rely on housings to position a sensor in fluid contact with a flow path. The systems then direct a light source onto the sensor and measure the light reflected off the sensor using an optical detector.

However, the systems and methods do not provide even distribution of the sampled fluid across an entire surface of both sides of the sensor. Also, the systems and methods are restricted to measurements obtained from the same surface on which the emitted light is cast. The systems typically access the sensor via an access port that requires a seal between the sensor and a housing to prevent fluid from flowing out of the access port. The access port limits the exposed sensor surface to a single side of the sensor because one side of the sensor surface must be positioned parallel to the direction of flow while an opposing side of the sensor surface must be made accessible to the access port. The housings are often unitary structures made of plastic that cannot be adapted for easy replacement of the sensor. Because the sensor must be accessed by a port, replacing the sensor can also contaminate the sampled fluid. Further, if the measured component is gaseous, the known systems rely on a semipermeable membrane to separate the gaseous measured component from the fluid, thereby making disposal and replacement of the sensor cumbersome.

The known systems and methods also fail to provide uniform illumination onto the sensor material. Certain housings fix a sensor at an intersection of two fluid paths or along a curved flow path. However, such cornered and curved housings rely on light reflected from the same surface on which the light is cast and fail to provide uniform dispersion onto the illuminated sensor surface. The housings also cannot detect a visible output on one side of a sensor surface that is opposite to the surface on which the light is cast. Although one or more translucent windows are sometimes placed directly over, or at an angle, to the sensor, the photo-detectors must still rely on light reflected off the same surface receiving the emitted light. The systems are also not designed for easy cleaning and removal of the sensor. The known housings not only add to design and manufacturing complexity, but also impede accurate measurement by limiting exposure of the sensor material to the sampled fluid. The known systems and methods also cannot be adapted for easy use with removable sensors.

Hence, there is a need for a fluid sensor apparatus and related removable colorimetric material, such as a pH and/or solute concentration sensor capable of being placed in a fluid flow path that can accurately detect either or both of the pH and solute concentration of the fluid, either in a combined sensor or in standalone sensors. There is a need for a system that provides uniform illumination onto the sensor surface. The need includes uniform backlighting. The need includes uniform distribution of fluid flow over the surface areas of the sensor, and preferably on both sides of a planar sensor. There is also a need for a fluid sensor apparatus that can detect fluid components and concentrations of solutes in the fluid by casting a light onto one side of a sensing material, and detecting a sensed output on another side of the sensor material. The need encompassing detecting sensed change by light being transmitted through a sensor. Using a disposable or reusable sensor card within the fluid sensor apparatus is also required. Another need includes systems and methods that avoid contamination across plural fluid flow paths or flow sessions. The need extends to a pH and/or ammonia sensor capable of returning consistent results using multiple removable sensors. The need includes an apparatus that can receive a removable sensor in a secured and consistent manner.

SUMMARY OF THE INVENTION

The first aspect of the invention is drawn to a fluid sensor apparatus. In any embodiment, the fluid sensor apparatus can include at least one fluid inlet fluidly connectable to a fluid flow path and at least one fluid outlet fluidly connectable to the fluid flow path; a receiving slot for receiving a sensor card in fluid communication with the fluid inlet and the fluid outlet; a light source directing light to a first side of the receiving slot; and a camera or a photo detector receiving light from a second side of the receiving slot opposing the first side of the receiving slot.

In any embodiment, the light source can be positioned on the first side of the receiving slot opposite to the camera or photodetector positioned on the second side of the receiving slot.

In any embodiment, a first light guide can direct light from the light source to the first side of the receiving slot and a second light guide can direct light received on the second side of the receiving slot directing light to the camera or photodetector.

In any embodiment, the fluid sensor apparatus can include a sampling chamber in fluid communication with the fluid inlet, the fluid outlet, and the receiving slot.

In any embodiment, the light source can be an LED array.

In any embodiment, the fluid sensor apparatus can include a receiving slot cover.

In any embodiment, an interior surface of the receiving slot can be non-reflective.

In any embodiment, the fluid sensor apparatus can include a receiving slot cover lock wherein the receiving slot cover lock fixes the receiving slot cover in a fixed position.

In any embodiment, the receiving slot cover lock can include a solenoid rod insertable into a hole in the receiving slot cover.

In any embodiment, the fluid sensor apparatus can have a bevel on an interior surface of the receiving slot cover wherein at least a portion of the sensor card is insertable into the bevel.

In any embodiment, the fluid sensor apparatus can have at least a first magnet in the fluid sensor apparatus and at least a second magnet in the detachable receiving slot cover.

In any embodiment, the camera or photodetector and the light source can define a line wherein the receiving slot is substantially orthogonal to the line.

In any embodiment, the fluid sensor apparatus can have a processor in communication with the camera or photodetector, the processor determining a pH, an ammonia concentration, or combinations thereof, based on temperature, a color of a pH sensing membrane and a color of an ammonia sensing membrane of the sensor card.

In any embodiment, the processor can determine an intensity of green pixels in an image produced by the camera or photodetector. In any embodiment, the processor can determine an intensity of red pixels in an image produced by the camera or photodetector. In any embodiment, the processor can determine an intensity of blue pixels in an image produced by the camera or photodetector. In any embodiment, the processor can determine any combination of red, blue, and green pixels in an image produced by the camera or photodetector and a resulting intensity of each color. In any embodiment, the processor can determine an intensity of light, a mean intensity of light, a variation in intensity of light, and a pixel location in an image produced by the camera or photodetector.

In any embodiment, the processor can be housed within the fluid sensor apparatus.

In any embodiment, the sensor card can have at least one fluid sensor membrane and a front carrier overlaying a front side of the at least one fluid sensor membrane and a back carrier overlaying a back side of the at least one fluid sensor membrane, and at least one pair of sampling holes positioned oppositely on the front carrier and back carrier wherein the pair of sampling holes is aligned over the front side and back side of the fluid sensor membrane.

In any embodiment, the fluid sensor apparatus can have at least a second fluid outlet fluidly connectable to the fluid flow path.

In any embodiment, the fluid sensor apparatus can have a temperature sensor in the sampling chamber.

Any of the features disclosed as being part of the first aspect of the invention can be included in the first aspect of the invention, either alone or in combination.

The second aspect of the invention is drawn to a dialysate flow path. In any embodiment, the dialysate flow path can include the fluid sensor apparatus described in the first aspect of the invention, a dialyzer, a sorbent cartridge, and a dialysate pump.

In any embodiment, the dialysate flow path can include a temperature sensor upstream of the fluid sensor apparatus.

In any embodiment, the sorbent cartridge can be positioned in the dialysate flow path upstream of the fluid inlet; and the dialyzer is positioned in the dialysate flow path downstream of the fluid outlet.

Any of the features disclosed as being part of the second aspect of the invention can be included in the second aspect of the invention, either alone or in combination.

The third aspect of the invention is drawn to a method. In any embodiment, the method can include flowing fluid through a fluid sensor apparatus; emitting light from a light source on a first side of the fluid sensor apparatus; detecting a sensed output on a second side of the fluid sensor apparatus; and determining at least one fluid characteristic based on the sensed output.

In any embodiment, the fluid sensor apparatus can contain a sensor card having a sensor surface, and the step of flowing fluid through a fluid sensor apparatus can include flowing a fluid across a first side of a sensor surface and a second side of a sensor surface, and the method can include determining a pH, a solute concentration, or combinations thereof, based on the sensed output. In any embodiment, the step of detecting a sensed output can be obtained from light reflected off the first side of the sensor surface.

In any embodiment, the method can include the step of determining a concentration of any one of aluminum, ammonium, calcium, carbonate, chloride, chlorine, chlorine dioxide, chromate, color, copper, cyanide, fluoride, formaldehyde, hydrazine, iron, magnesium, manganese, nickel, nitrate, nitrite, oxygen, ozone, pH, phosphate, residual hardness, silicate, sulfate, sulfide, sulfite, total hardness, urea, zinc, or combinations thereof based on the sensed output.

In any embodiment, the method can include the step of continuously flowing the fluid across the first side of the sensor surface and the second side of the sensor surface.

In any embodiment, the method can include the step of intermittently flowing the fluid across the first side of the sensor surface and the second side of the sensor surface.

In any embodiment, the method can include the step of flowing any clear, aqueous solution across the first side of the sensor surface and the second side of the sensor surface.

In any embodiment, the method can include the step of flowing any of a dialysis fluid, peritoneal dialysis fluid, rinseback fluid, or hemodialysis fluid through the fluid sensor apparatus.

In any embodiment, the method can include the step of receiving data from the sensed output by a camera or photodetector, and determining the fluid characteristic using a processor.

In any embodiment, the method can include the step of determining a temperature of the fluid.

In any embodiment, the method can include the step of determining a total ammonia concentration of a dialysate based on the pH, an ammonia concentration, and the temperature.

In any embodiment, the fluid characteristic can be any one of a cloudiness of the fluid, a color of the fluid, or a clarity of the fluid.

In any embodiment, the fluid can be a peritoneal dialysate effluent.

In any embodiment, the method can include the step of determining a composition of the fluid based on the sensed output.

Any of the features disclosed as being part of the third aspect of the invention can be included in the third aspect of the invention, either alone or in combination.

DETAILED DESCRIPTION OF THE INVENTION

Figure 1A:
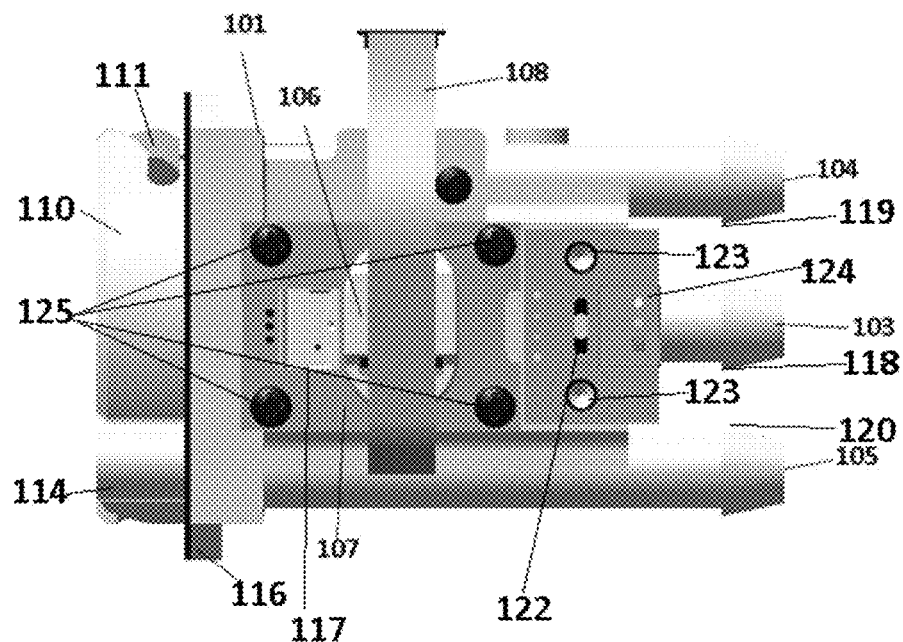
FIGS. 1A-F show a side, perspective, and top view of a fluid sensor apparatus.

Unless defined otherwise, all technical and scientific terms used herein generally have the same meaning as commonly understood by one of ordinary skill in the relevant art.

The articles "a" and "an" are used herein to refer to one or to more than one (i.e., to at least one) of the grammatical object of the article. For example, "an element" means one element or more than one element.

The term "aligned" refers to the relative positions of two components, wherein one component is overlaying or positioned close to the second component.

The term "ammonia level" refers to a concentration of ammonia ($NH_3$).

The term "ammonium level" refers to a concentration of ammonium cation ($NH_4^+$).

An "ammonia sensing membrane" is any material, substance, dye, or composition that can detect an ammonia level. The detected output can be a color change, or color intensity change. The output can also include any detectable physical or chemical change.

A "bevel" is an opening or groove in a component having a slope from the otherwise horizontal or vertical face of the component.

A "camera," "photodetector," and the like is a component capable of detecting light intensity, light composition, or both to result in data, such as an image, of the light detected. The terms "camera" and "photo detector" can also generally refer to any type of detector including an RGB detector or spectrophotometer.

A "carrier" is a component on a sensor card overlaying one or more fluid sensor membranes. The terms "front carrier" or "back carrier" refer to carriers on either side of the fluid sensor membranes on the front side and back side of the sensor card, respectively.

A "center axis" is an imaginary line through the center of a component or region. For example, a center axis can be positioned at substantially a center portion of a surface plane of a sensor card or lens and perpendicular to the surface plane.

The term "clarity" refers to an amount of radiant light or energy shined on a fluid that passes through the fluid.

A "clear aqueous solution" is a solution of any substance or substances dissolved in water that is substantially translucent.

The term "cloudiness" refers to the amount of light transmitted through a fluid containing one or more solutes as compared to the amount of light transmitted through the fluid without any solutes.

The term "color" refers to the wavelength of light reflected from or transmitted through a component or feature.

The terms "communication" or "electronic communication" refer to the ability to transmit electronic information between two components or systems.

The phrase "composition of a fluid" can refer to the concentration of any one or more solutes in the fluid.

The term "comprising" includes, but is not limited to, whatever follows the word "comprising." Use of the term indicates the listed elements are required or mandatory but that other elements are optional and may be present.

The term "consisting of" includes and is limited to whatever follows the phrase "consisting of." The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The term "continuously" refers to a process that proceeds without stopping.

The terms "detecting," "detected," or "to detect" refer to determining a state or characteristic of a system.

The terms "determining" and "determine" refer to ascertaining a particular state of a system or variable(s).

A "dialysate flow path" is the pathway that dialysate will travel when used in normal operation for dialysis.

A "dialysate pump" is a device that causes the movement of fluids or gases through a dialysate flow path by applying suction or pressure.

A "dialysis fluid" is any fluid used in cleaning a dialysis system, priming a dialysis system, or conducting dialysis.

The term "dialyzer" refers to a cartridge or container with two flow paths separated by semi-permeable membranes.

One flow path is for blood and one flow path is for dialysate. The membranes can be in hollow fibers, flat sheets, or spiral wound or other conventional forms known to those of skill in the art. Membranes can be selected from the following materials of polysulfone, polyethersulfone, poly (methyl methacrylate), modified cellulose, or other materials known to those skilled in the art.

The term "downstream" refers to a position of a first component in a flow path relative to a second component wherein fluid will pass by the second component prior to the first component during normal operation. The first component can be said to be "downstream" of the second component, while the second component is "upstream" of the first component.

The terms "emitting" or to "emit" refer to discharging light from a light source.

The term "equidistant" refers to two or more components or regions that are the same distance from a reference point.

The terms "fixing," to "fix," or "fixed position" refer to a position of a component that will resist inadvertent movement.

The terms "flowing" or to "flow" "refer to the movement of a fluid or gas.

A "fluid" is a liquid substance optionally having a combination of gas and liquid phases in the fluid. Notably, a liquid, as used herein, can therefore also have a mixture of gas and liquid phases of matter.

A "fluid characteristic" is any sensed characteristic of a fluid, including temperature, pressure, concentration, color, or any other characteristic.

The term "fluid flow path" refers to a pathway through which a fluid can travel.

The term "fluid inlet" refers to a conduit or opening through which fluid can enter a component or apparatus.

The term "fluid outlet" refers to a conduit or opening through which fluid can exit a component or apparatus.

The term "fluid sensor apparatus" refers to an apparatus through which fluid can be pumped to determine any one of a solute, solute concentration, ion concentration, a pH, or a combination of solutes in the fluid.

The term "fluidly connectable," "fluidly connect," "for fluid connection," "fluid communication," and the like, refer to the ability of providing for passing fluid or gas or mixtures thereof, from one point to another point. The two points can be within or between any one or more of compartments, modules, systems, components, and rechargers, all of any type. The connection can optionally be disconnected and then reconnected.

The term "green" as used in reference to color or pixel color, refers to light having a wavelength generally in a range from about 490 nm to 570 nm.

The tem "groove" is a furrow or channel formed onto a surface or wall. The groove extending along the surface or wall can form a slot.

A "hemodialysis fluid" is any fluid used in cleaning a hemodialysis system, priming a hemodialysis system, or conducting hemodialysis.

A "high sensitivity ammonia sensing membrane" is an ammonia sensing membrane capable of detecting changes in ammonia concentration less than 2 ppm ammonia.

The term "hole" refers to an opening on at least one side of a component. The hole can optionally be an opening from one side to another side of a component.

The term "housed within" refers to a position of a component inside of a second component or system.

An "image produced by a camera" refers to a digital representation of the visible light or fluorescent light detected by the camera.

The term "insertable" refers to the ability to place one component inside or through a second component.

The term "intensity" refers to the amplitude of a light or energy wave.

The term "interior surface" refers to an interior boundary of a component.

The term "intermittently" refers to a process that stops and starts at discreet time points.

An "LED array" is any configuration of light emitting diodes. In one non-limiting example, the LED array is a circular or consistently spaced placement of individual LED lights. The term "array," as used herein, is not intended to be limited to any particular configuration, but conveys a regularized or uniform positioning of individual LED lights. The term "LED array" is not limited to any color or colors of LEDs or any particular placement of LEDs.

A "light guide" refers to a component that can transmit light in a defined path by means of total or near total internal reflectance using reflective surfaces of any type, size, position, and length.

A "line" is a straight one-dimensional shape extending from one point in space to a second point in space.

A "light source," "light emitter," "photo emitter," or the like, is any component capable of emitting light at any wavelength including visible, infrared, or ultraviolet light.

A "low sensitivity ammonia sensing membrane" is an ammonia sensing membrane capable of detecting changes in ammonia concentration over a range of between 2-20 ppm ammonia, or greater than 2 ppm ammonia.

A "magnet" is a material with the constituent atoms of the material ordered so that the material attracts other magnetic objects.

The term "non-reflective" refers to a material or color that absorbs substantially all visible or ultraviolet light.

The terms "opposing," "opposite," and "positioned opposedly" refer to relative positions of two or more components wherein the two or more components are positioned substantially on opposite sides to a reference point.

The term "orthogonal" or "substantially orthogonal" refers to a component substantially at a 90° angle to a line.

The term "overlaying" refers to a first component being positioned on top of, or covering, a second component.

The term "peritoneal dialysate effluent" refers to used dialysate removed from the peritoneal cavity of a patient during peritoneal dialysis.

A "peritoneal dialysis fluid" is any fluid used in cleaning a peritoneal dialysis system, priming a peritoneal dialysis system, or conducting peritoneal dialysis.

A "pH sensing membrane" is a dye embedded in a substrate, wherein the dye changes colors in response to the pH of a fluid.

A "pixel" is a small uniformly colored area of an image. The term can also be interchangeably used to refer to a picture element on a display, computer image or screen for creating an image. The term "pixel" can also refer to sensing elements of a camera image sensor.

The term "plane" is an imaginary two dimensional shape defined by three or more points.

The term "positioned" or "position" refers to a physical location of a component, feature, or structure.

The term "processor" as used is a broad term and is to be given its ordinary and customary meaning to a person of ordinary skill in the art. The term refers without limitation to a computer system, state machine, processor, or the like designed to perform arithmetic or logic operations using logic circuitry that responds to and processes the basic instructions that drive a computer. In any embodiment of the first, second, third, and fourth invention, the terms can include ROM ("read-only memory") and/or RAM ("random-access memory") associated therewith.

The term "receiving data" or to "receive data" refers to obtaining electronic information from a source or sensor.

The term "receiving light" or to "receive light" refers to obtaining light at any wavelength or intensity. The received light can be obtained by a sensor, a lens, a camera, a photodetector, or any surface capable of receiving light from a light source.

The term "receiving slot" is a space within a fluid sensor apparatus into which a sensor card can be placed.

A "receiving slot cover" is a component designed to fit over a receiving slot, separating the receiving slot from the outside of an apparatus.

A "receiving slot cover lock" is a component in a sensor apparatus that can engage with a cover of a receiving slot to fix the receiving slot cover in a fixed position.

A "rinseback fluid" is a fluid added to a dialysate flow path, forcing fluid from the dialysate flow path either through a dialyzer or out of a dialysis system.

A "sampling chamber" is a space or volume in which a characteristic of liquids, solids, gases, or combinations of liquids, solids, and gases can be determined.

A "sampling hole" is a hole in a portion of a sensor card through which fluid and light can contact a fluid sensor membrane.

The term "sensed output" refer to a variable detected from a system.

The term "sensor card" refers to a rigid and/or planar component having at least one sensing membrane or sensing material of any kind disposed on, inside or integral to the "sensor card." The sensing membrane or material can contact a fluid, and produce a detectable change in response to a fluid characteristic of the fluid.

A "side of the receiving slot" refers to a position relative to a receiving slot.

A "side of a sensor surface" is any portion of a sensing material having a surface area.

A "sidewall" is a wall formed from a side of a defined chamber, compartment, feature, or structure of any type.

A "solenoid rod" is a metal rod used with an electromagnetic coil. The solenoid rod can be a switch wherein the metal rod slides along the coil axis under the influence of a magnetic field generated by the electromagnetic coil in opposite directions depending on the polarity of the magnetic field.

The term "solute concentration" refers to the amount of a first substance dissolved in a second substance.

The term "sorbent cartridge" refers to a cartridge containing one or more sorbent materials for removing specific solutes from solution. The term "sorbent cartridge" does not require the contents in the cartridge be sorbent based, and the contents of the sorbent cartridge can be any contents that can remove solutes from a dialysate. The sorbent cartridge may include any suitable amount of one or more sorbent materials. In certain instances, the term "sorbent cartridge" refers to a cartridge which includes one or more sorbent materials besides one or more other materials capable of removing solutes from dialysate. "Sorbent cartridge" can include configurations where at least some materials in the cartridge do not act by mechanisms of adsorption or absorption.

The term "temperature sensor" refers to a device for measuring the temperature of a gas or liquid in a vessel, container, or fluid line.

The term "total ammonia concentration" refers to the sum of the concentration of ammonia and the concentration of ammonium ions in a fluid.

The term "upstream" refers to a position of a first component in a flow path relative to a second component wherein fluid will pass by the first component prior to the second component during normal operation. The first component can be said to be "upstream" of the second component, while the second component is "downstream" of the first component.

Fluid Sensor Apparatus

Figure 1B:
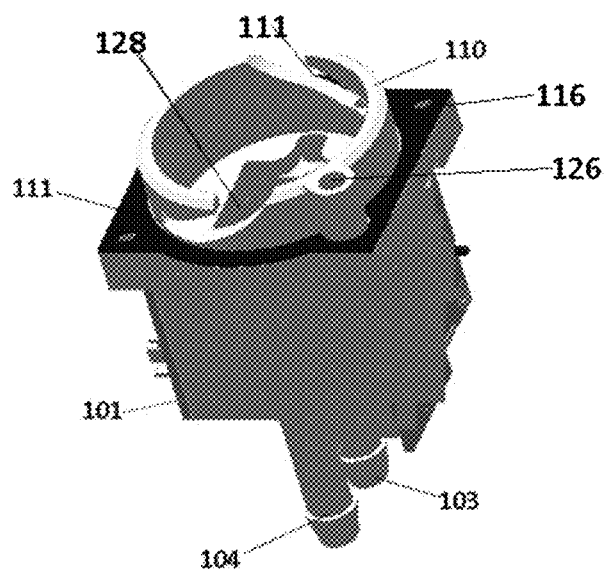
Figure 1C:
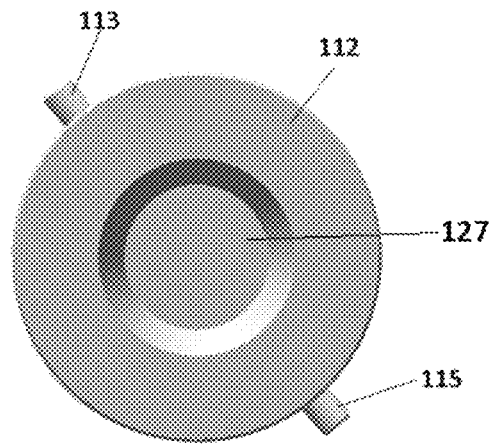
Figure 1D:
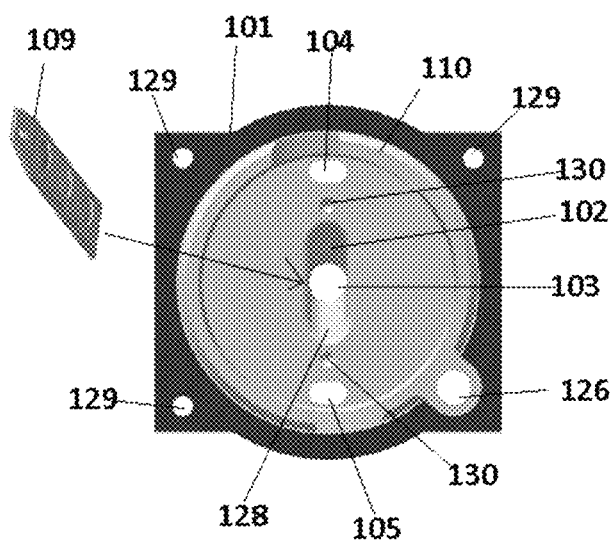
Figure 1E:
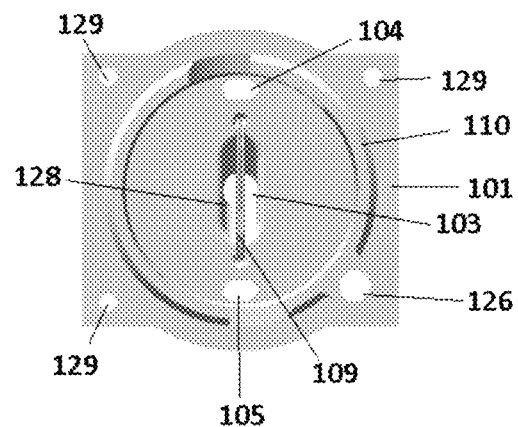
Figure 1F:
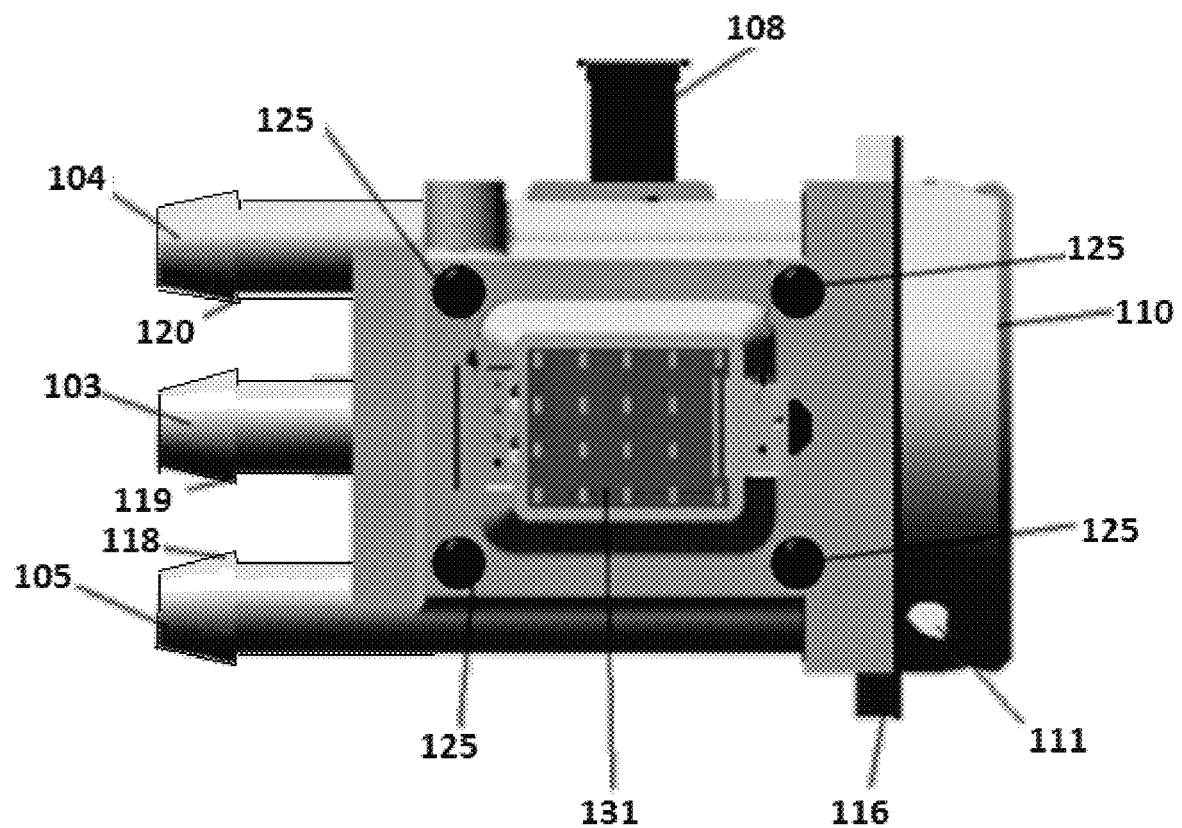

FIGS. 1A-F illustrate a non-limiting embodiment of a fluid sensor apparatus 101. FIG. 1A illustrates a side view of the fluid sensor apparatus 101; FIG. 1B illustrates a perspective view of the fluid sensor apparatus 101; FIG. 1C illustrates a receiving slot cover 112 for the fluid sensor apparatus 101; FIG. 1D illustrates a cut-away portion of the flow sensor apparatus 101 at a specified depth and a sensor card 109 being inserted into a receiving slot 102 of the fluid sensor apparatus 101; FIG. 1E illustrates a front view of the fluid sensor apparatus 101 with the sensor card 109 inserted; and FIG. 1F illustrates a side view of the fluid sensor apparatus 101.

As shown in FIG. 1D, the fluid sensor apparatus 101 has a receiving slot 102 traversing a sampling chamber 128 along an axis. A removable sensor card 109 can be inserted into the receiving slot 102 as illustrated in FIGS. 1D and 1E to a specified depth of the fluid sensor apparatus 101. Indentations 130 on either side of the sampling chamber 128 at the depth of the fluid sensor apparatus 101 in FIG. 1D, can receive an edge of the sensor card 109, to seat or fasten the sensor card 109 in place. At a higher depth of the fluid sensor apparatus 101, a groove can be formed appurtenant to a sidewall of the sampling chamber 128 to receive a side edge of the sensor card 109. An edge of the sensor card 109 can be securely positioned in the sampling chamber 128 at a specified location or orientation with respect to a light source and/or photo detector. Alternatively, one or more grooves can be formed into the fluid sensor apparatus 101 to receive an edge of the sensor card 109 to securely position the sensor card 109 at a specified location or orientation if the sensor card 109 has a width greater than any axis of the sampling chamber 128 as shown in FIG. 1E.

Figure 3:
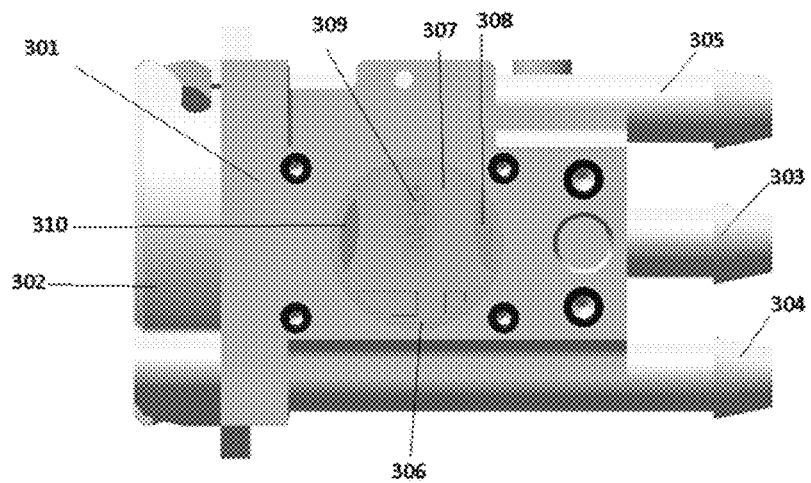
FIG. 3 shows a side view of a fluid sensor apparatus with an inserted sensor card.

The sampling chamber 128 can have a plurality of clear windows on the sidewalls as shown in FIG. 3 to provide optical access to the sensor card 109. Holes 129 formed into the body of the fluid sensor apparatus 101 can be used to attach the fluid sensor apparatus 101 to a console or system using screws or other fasteners as shown in FIG. 1D. The sampling chamber 128 extends longitudinally along a length of the receiving slot 102 of the fluid sensor apparatus 101. The receiving slot 102 can extend beyond the sampling chamber 128 and terminate in a fastening mechanism to securely hold the sensor card 109, such as the indentation 130. The sampling chamber 128 can mix fluids to improve fluid contact on the sensor card 109. Notably, the sampling chamber 128 defines a volume such that a front side and a back side of the sensor card 109 can be exposed to fluid flow on both sides of the sensor card 109. The sampled fluid can therefore simultaneously contact a first and second side (or front and back) of the sensor card 109 to advantageously increase the surface area on which fluid contacts sensing membranes in the sensor card 109. The resulting mixing can result in improved sensing of the fluid by the sensor card 109 by making the response of the sensor card to changes in the fluid faster.

The sensor card 109 can have at least a pH sensing membrane and an ammonia sensing membrane. Further, the ammonia sensing membrane can be a low sensitivity or high sensitivity membrane as described herein. The pH sensing membrane, the ammonia sensing membranes, or both can change color, optical transmittance, or change emitted fluorescent light intensity or wavelength based on a pH or ammonia level of a fluid flowing through the sampling chamber 128.

However, the sensor card is not limited to pH and ammonia sensing membranes, and can include any colorimetric material producing a detectable change in response to a concentration or other fluid characteristic of a fluid. In general, the colorimetric material can produce any visible change such as change in color or optical transmittance, or a change in emitted fluorescent light intensity or wavelength, wherein the visible change is detected by the photodetector or camera of the present invention. Non-limiting examples of colorimetric materials that can be embedded in a sensing membrane include bromothymol blue for the detection of antifreeze or other substances, lead acetate for the detection of sulfides, glucose oxidase for the detection of glucose, benzidine-type chromogens for the detection of chlorine, or any other colorimetric materials known in the art. Additional materials that can be included in the sensing membranes include ACUSTRIP 711254 for detection of antifreeze coolant in automatic transmission fluid, ACU987600 for detection of ethanol in fuel, Acustrip Metals Test® for detection of wear metals in fluid, and the Acustrip 84050 mold test for the presence of mold in a fluid, each available from Acustrip®, a New Jersey corporation. Other non-limiting colorimetric materials include materials for testing alkalinity, aluminum, ammonium, calcium, carbonate, chloride, chlorine, chlorine dioxide, chromate, color, copper, cyanide, fluoride, formaldehyde, hydrazine, iron, magnesium, manganese, nickel, nitrate, nitrite, oxygen, ozone, pH, phosphate, residual hardness, silicate, sulfate, sulfide, sulfite, total hardness, urea, and zinc, each available from EMD Millipore, a Massachusetts corporation. The sensor card can also include only a pH sensing membrane, only an ammonia sensing membrane, or a sensing membrane having any type of colorimetric material.

As described, the color change can be observed through the one or more clear windows positioned on the sidewall of the sampling chamber 128. The sensing membranes can be any material sensitive to a component of the fluid in the fluid path to be sensed. The sensing membrane has a property reacting to a fluid component that changes an optical parameter depending on the concentration of the component in the fluid or any other fluid characteristic. The optical parameter can be any one of color, reflectivity, transitivity fluorescence, adsorption, or any other parameter capable of being optically detected. In a preferred embodiment, the sensing membrane changes color in relationship to changes in the solute concentration of the measured fluid component. For example, the membrane can change color in a first direction along a color spectrum as the solute concentration of the component in the fluid increases, and along a second direction as the solute concentration of the component decreases. The color change of the membrane can be continuous and reversible in response to the component concentration. In the case of an ammonia sensing membrane, a dye can be embedded in a substrate, wherein the dye changes colors in response to an ammonia concentration of a fluid.

In one embodiment, the fluid sensor apparatus of the invention can detect pH changes of ±0.2 pH units within 10 minutes with a reliability of 95% and confidence of 95% in a pH range of around 6.8 to 7.8. The fluid sensor can also detect pH changes at any one of ±0.25 pH units, ±0.3 pH units, ±0.15 pH units, or ±0.1 pH units with reliability of >75% and confidence of >75%. The fluid sensor apparatus of the invention can also measure pH changes with an accuracy of ±0.1 pH units with a reliability of 95% and confidence of 95% in a pH range of around 6.8 to 7.8. Further, the fluid sensor can measure pH changes with an accuracy of any one of ±0.05 pH units, ±0.15 pH units, ±0.2 pH units, or ±0.3 pH units with reliability of >75% and confidence of >75%. The pH detection range can be dependent upon the dye used, and altered by changing the pH sensitive dye used in the sensor membranes of the fluid sensor apparatus. In one non-limiting example, at a total ammonia concentration range of 1 to 20 ppm, the fluid sensor apparatus of the invention can detect ±1 ppm total ammonia changes within 10 minutes with a reliability of 95% and confidence of 95% in a pH range of around 6.8 to 7.8. The fluid sensor apparatus can also detect total ammonia at any one of ±0.5 ppm, ±1.5 ppm, ±2.0 ppm, or ±2.5 ppm with reliability of >75% and confidence of >75%. The ammonia detection range can be dependent upon the ammonia sensitive dye used, and can be altered by changing the ammonia sensitive dye. At a total ammonia concentration range of 1 to 5 ppm, the fluid sensor apparatus of the invention can measure total ammonia concentration with an accuracy of ±0.2 ppm total ammonia changes within 10 minutes with a reliability of 95% and confidence of 95% in a pH range of around 6.8 to 7.8. Alternatively, the fluid sensor can measure total ammonia concentration with an accuracy at any one of ±0.5 ppm, ±1.5 ppm, ±2.0 ppm, or ±2.5 ppm with reliability of >75% and confidence of >75%. Temperature probe 122 can determine the temperature of the fluid within the fluid sensor apparatus 101 for determination of total ammonia content based on the ammonia concentration and pH. Electrical connector 124 provides the electrical connection from the temperature probe 122 to the fluid sensor apparatus 101. The fluid sensor apparatus is not limited to detection of pH and/or ammonia, and can detect any substance that can produce a detectable change in a substrate on a sensor card. Any colorimetric material can be included in the sensor card for detection of any substance.

In FIG. 1F, one non-limiting example of a light source is shown as LED array 131 connected to the system by electrical connector 117. The LED array 131 can shine a light onto a first side of the sensor card 109 seated inside the receiving slot 102. The light can be directed through the one or more clear windows in the sidewall of the sampling chamber 128. The light source can be any source of light at any wavelength capable of shining light onto the sensor card 109. In a preferred embodiment, the LED provides white light; however, any color or wavelength of light can be used. In a preferred embodiment, the light source provides uniform backlighting onto one side of the sensor card 109 such that a camera 106 (shown in FIG. 1A) positioned on an opposite side of the fluid sensor apparatus 101 can detect changes on an opposite side of the sensor card 109 via one or more clear windows. However, the LED array 131 can be positioned at any part of the apparatus capable of providing uniform light to the sensor card 109, including direct and side-firing or side-emitting LEDs. Importantly, light can be transmitted through the sensor card 109 and detected on an opposite side on which light is cast. In general, the clear windows for the LED array 131 and camera 106 can be antipodal to each other. The camera 106 can be any appropriate photodetector, spectrophotometer, or photosensor known to those of ordinary skill in the art. The camera 106 can transmit the image or sensed output to a processor for determining the pH or ammonia level of a fluid. The camera or photodetector 106 can also detect fluorescent light emitted from the sensor card. For detection of fluorescent light, an optical bandpass filter can be included in front of the camera to allow the emitted fluorescent light to pass to the camera while blocking any transmitted light from the LED array. The camera can detect any change in the light transmitted including the wavelength of light, the mean intensity of light, the variation in intensity of light, and the pixel location in an image produced by the camera. Variation in intensity of light and pixel location allow the automatic detection of the sensor membrane position in the image captured by the photodetector for image analysis, making image analysis easier due to the known variations in intensity and location. A second LED array (not shown) or other light source can be included on the same side of the sensor card 109 as the camera 106 for illumination of a barcode or other identification component on the sensor card 109. The second LED array or light source can illuminate the identification component, which can then be read by the camera 106 to ensure the proper sensor card is being used or to obtain data from the barcode or identification component.

In a preferred embodiment, the light is uniformly cast onto the sensor card 109. Such uniform lighting provided by an ordered arrangement of light sources can result in uniform or even backlighting onto the sensor card 109. The luminous intensity of the light on each sensing membrane can also be uniform, meaning that the power of the light emitted by the LED array in each direction to each sensing membrane is uniform. The luminous flux, or the quantity of energy of the light transmitted onto each sensing membrane, can also be uniform, as can the illuminance, or luminous flux per area of the sensing membranes. The uniform lighting can be an ordered array of light sources, or a single homogenous light source that casts even lighting onto a surface. Diffuser films and a light cavity can also be included to provide uniform lighting. Diffuser films are thin films that evenly distribute transmitted light. Non-limiting examples of diffuser films include Brightness Enhancement Film (BEF), Dual Brightness Enhancement Film (DBEF), and Universal Diffuser Film 50 (UDF 50), available from 3M™, a Minnesota corporation. A light cavity is an arrangement of mirrors or other reflectors, such as white surfaces, that form standing waves from light. Advantageously, uniform backlighting can improve accuracy of the sensed color changes on the sensor card 109. The clear windows can be similarly positioned uniformly or in a pattern on the sidewalls to receive the uniform light dispersion. For example, the lights on the LED array 131 can be arranged in any shape, including rectangular, circular, or other shape, to cast light onto the sensor card 109 in a desired dispersion. The sensing membranes can then be positioned on the sensor card 109 to align with light cast by the LED array 131. Further, the power supply for the LED array 131 can provide a stable current and voltage to increase light uniformity.

Although illustrated as opposing the camera, the LED array 131 can be positioned anywhere on the fluid sensor apparatus 101, including on any side of the fluid sensor apparatus 101. A light guide can be included to allow light from an LED array positioned on a side of the fluid sensor apparatus 101 to be transmitted through the sensor card and onto the camera along any reflectance pathway. For example, a mirror arrangement can guide light to a camera or photodetector such that the camera or photodetector need not be in directly positioned opposite to the light source. The light guide can provide a reflectance pathway such that the camera or photodetector can be positioned in any convenient location to receive the reflected light. Similarly, the LEDs or any light source can rely on a light guide to direct light such that light sources can be conveniently positioned at any position, and need not be opposedly positioned to the camera or photodetector. In one embodiment, both the light source and the camera or photodetector transmit and receive light, respectively, using a light guide. The backlight settings can be computer controlled to optimize the backlight for each sensor membrane. The light from the LED array can be set at a first intensity, optimized for a first sensor membrane. The LED can then be switched to a second intensity, optimized for a second sensor membrane. The camera can take an image of each sensor membrane at the optimized backlighting.

In FIGS. 1A and F, the camera 106 and LED array 131 can be placed on opposing sides of the receiving slot 102 to help reduce hot spots formed on the sensor card 109. The light source shown as the LED array 131 and the photo camera described as camera 106 can be positioned opposite to each other on a line or plane that is substantially orthogonal to the receiving slot 102 containing the sensor card 109. A grating light valve (not shown) having an adjustable diffraction grating can be included to control the intensity of light diffracted onto the camera 106. The diffraction grating can be a set of equally spaced, narrow, parallel grates. The grates can disperse the light at different wavelengths, so that light intensity can be measured as a function of a particular wavelength. One or more light diffusive layers can also be included to diffuse the light shining on the sensing material of the sensor card 109 prior to detection by the camera 106. The clear windows can be free from scratches that degrade the sensor performance. In one non-limiting embodiment, to reduce scratches to the clear windows, the windows can be solvent polished. As shown in FIG. 1F, the camera 106 can transmit the image or other sensed output to a processor (not shown) in electronic communication with the camera 106 via electronic link 108.

As described, the processor can determine the color of the pH sensing membrane and ammonia sensing membrane to determine the pH and/or ammonia level, or the concentration of any solutes or ions, in the fluid flowing through the fluid sensor apparatus 101 based on the sensed output. Electronics 107 of FIG. 1A can control the camera 106 and the light source. Although illustrated as having wired communication links between the camera, electronics, and processor, one of skill in the art will understand that any method of transmitting and receiving data can be used, including Bluetooth, Wi-Fi, or any other methods known in the art. The processor can receive data, and in particular the image produced by the camera, and determine the intensity of the pixels of a particular color in an image of the sensing membranes. Experiments have shown green light to provide a good correlation between the sensing membranes and the lab tested pH or ammonia level. The processor can then determine the intensity of green pixels in the image produced by the camera. However, other colors such as red, blue, or any other suitable color can be used. The definitions of red, green, and blue light can be based on the camera operating software, or can be specified by a controller or operating control logic. A spectrophotometer, which measures the wavelength and intensity of the transmitted light can also be used. Advantageously, a spectrophotometer can be more specific to a color of light detected. The processor can then determine the ammonia level, the pH, and/or the total ammonia concentration in the fluid based on the intensity of the green pixels detected. The processor can use lookup tables, algorithms or any other method for correlating the number of color pixels in the image produced by the camera to a pH or ammonia level. The processor can be housed within, or positioned outside of, the fluid sensor apparatus 101. The camera 106 can be operated under manual control or by a software application for controlling the exposure, gain and white balance.

As shown in FIG. 1A, fluid can enter the fluid sensor apparatus 101 through a fluid inlet 103 and into the sampling chamber 128 of FIG. 1D. The fluid contacts the sensor card 109 seated in the receiving slot 102 of the sampling chamber 128. The fluid can then exit the sampling chamber 128 through fluid outlets 104 and 105. The fluid outlets 104 and 105 and the fluid inlet 103 can be both positioned on the same side of the sampling chamber 128 to provide a curved fluid flow path such that fluid can enter through the fluid inlet 103 positioned in between fluid outlets 104 and 105 wherein fluid then flows into a first end of the sampling chamber 128 and flows in a curved flow path and out a second end of the sampling chamber 128 and into the two fluid outlets 104 and 105 positioned on the same side as the sampling chamber 128. Conversely, the two fluid outlets 104 and 105 can be used as inlets to introduce fluid into sampling chamber 128 along a curved flow path such that fluid flows into and out of the fluid inlet 103. One of skill in the art will understand that one or more fluid inlets and outlets can be used. In a preferred embodiment, the two fluid outlets 104 and 105 advantageously improve fluid contact of the sensing membrane of the sensor card 109. Notch 118 on fluid inlet 103, notch 119 on outlet 104, and notch 120 on outlet 105 can provide secured fastening of the fluid inlet 103 and fluid outlets 104 and 105 to tubing as needed.

In FIG. 1C, the receiving slot 102 can include additional components to ensure that the detachable receiving slot cover 112 fits tightly over the receiving slot 102 and does not move as fluid is flowed into and through the sampling chamber 128. As illustrated in FIGS. 1A and 1B, the receiving slot 102 can have an extended portion 110 that will contact the receiving slot cover 112 when closed. The extended portion 110 can include grooves 111 and 114 for receiving pins 113 and 115 when the receiving slot cover 112 is placed over the receiving slot 102. The pins 113 and 115 engage with the grooves 111 to ensure the receiving slot cover 112 is properly placed and securely fastened on the fluid sensor apparatus 101.

To improve accurate measurements of pH and/or solute concentration, the sensor card 109 can be fixed into a specified position and/or orientation inside the receiving slot 102 to resist any movement due to the flow of the fluid. Any suitable fastener to fix the receiving slot cover 112 to the fluid sensor apparatus 101 is contemplated. Magnets can be placed within the receiving slot cover 112 and the fluid sensor apparatus 101 to determine whether the receiving slot cover is in the proper position. If the receiving slot cover 112 is closed, the magnets can provide a means to determine if cover 112 is closed over the receiving slot 102 on the fluid sensor apparatus 101. As shown in FIG. 1F, overhang 116 can provide support for the receiving slot cover 112 when closed. In FIGS. 1D and 1E, opening 126 on extended portion 110 can provide for a fastener to be inserted through the receiving slot cover 112 to secure the receiving slot cover 112 onto the fluid sensor apparatus 101.

In FIG. 1C, an annular bevel 127 can be formed on the receiving slot cover 112 to capture the sensor card and hold the sensor card securely locked in the sensor apparatus 101. Screws 125 fasten the electronics and camera 106 to the fluid sensor apparatus 101. Alternative methods of securing components to the fluid sensor apparatus 101 can be used, including adhesive, glue, bolts, or any other securing components known in the art. Holes 123 allow additional components and electronics to be added to the fluid sensor apparatus 101.

Figure 2:
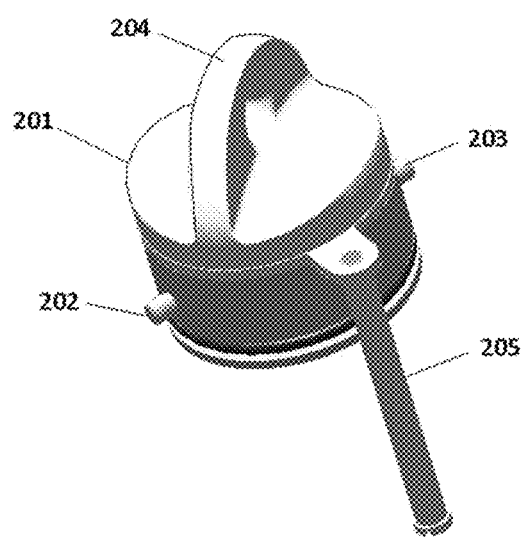
FIG. 2 shows a perspective view of a receiving slot cover for a fluid sensor apparatus.

FIG. 2 illustrates a close-up view of a receiving slot cover 201 of the fluid sensor apparatus 101. As described, the receiving slot cover 201 can include pins 202 and 203 to hold the receiving slot cover 201 in place on the fluid sensor apparatus 101 (FIG. 1A). The receiving slot cover 201 can also include a handle 204 to facilitate twisting of the receiving slot cover 201 for attachment and detachment of the receiving slot cover 201 to the fluid sensor apparatus 101. A sliding rod 205 can be included as a means to secure the receiving slot cover 201 when the receiving slot cover is open on the fluid sensor apparatus 101 and to prevent the cover from being removed during use. Once inserted, the sensor card can be fixed regarding the receiving slot cover 201 to ensure that the sensor card does not move within the receiving slot 102 of FIG. 1D as fluid flows over the sensor card. Alternatively, the sliding rod 205 can be attached to the fluid sensor apparatus 101 and inserted into a hole on the receiving slot cover 201. Fixing the sensor card within the fluid sensor apparatus 101 provides the camera 106 (FIG. 1A) with a constant focal length, increasing the accuracy of the sensor. Additionally, a bevel 127 (FIG. 1C) can be included on an interior surface of the receiving slot cover 201 for fixing the sensor card in place. The sensor card can be inserted into the bevel to lock the sensor card in a fixed position and to prevent insertion of the sensor card at a 180° rotation from the intended configuration. The bevel only allows the sensor card to be inserted into the fluid sensor apparatus in a single configuration. The bevel can be sized and shaped to conform to an edge of the sensor card, fixing the sensor card in position when placed into the bevel. The distance from the sensor card to the camera 106 can be any length, including between 15 and 20 mm. The camera lens can be configured with a focal length equal to the fixed distance between the camera 106 and sensor card.

FIG. 3 illustrates a side view of the fluid sensor apparatus with the camera 106 of FIG. 1A removed. Fluid enters the fluid sensor apparatus 301 through fluid inlet 303, and exits through fluid outlets 304 and 305. The fluid inlet 303 and two fluid outlets 304 and 305 can provide uniform flow and increase fluid contact to the sensor card 307. The sensor card 307 can then be inserted into a receiving slot within the fluid sensor apparatus 301. A receiving slot cover (not shown) fits over an extended portion 302 of the fluid sensor apparatus 301 fixing the sensor card 307 in a fixed position. A clear window 306 is positioned on a sidewall of the sampling chamber to provide optical access to the sensor card 307. A camera (not shown) is placed outside of the clear window 306 to capture the light transmitted through the fluid sensor apparatus 301 through a second clear window (not shown) positioned antipodal to the clear window 306 aligned over an opposite side of the sensor card 307. The camera can also be positioned within the fluid sensor apparatus 301. Optionally, a waterproof camera can be used having components that are sealed to prevent damage to the camera from the fluid circulating inside the fluid sensor apparatus 301. An LED array or other light source can shine light through the second clear window and the sensor card 307, which is then detected by the camera and correlated to a pH and/or ammonia level in the fluid. In another embodiment, the use of one or more clear windows can be avoided by positioning a lens portion of the camera to be in direct contact with fluid circulating inside the fluid sensor apparatus 301. Portions of the camera can be waterproof to avoid damage; particularly, a portion of a camera lens contacting fluid being sealed from a portion of the camera containing electronics and componentry. The sensor card 307 can include one or more sensing membranes, including any colorimetric material. In one non-limiting embodiment, the sensor card can include a low sensitivity ammonia sensing membrane 308, high sensitivity ammonia sensing membrane 309 and pH sensing membrane 310. The sensor card can also include an optional reference sensing region allowing specific wavelengths of light to be transmitted. The reference sensing region provides a reference against which the changes in color or intensity from the sensing membranes can be compared. The reference sensing region allows monitoring and control for any changes in the optical path of light due to dirty or scratched windows or variable light intensity from the light source. The reference sensing region can be colored dots on the sensor card. The colored dots or other reference sensing region can be read by the camera for self-calibration. The self-calibration, using the known color of the reference sensing region, allows the processor to adjust for lot variance in the base sensing material. The sensing membranes can include an embedded dye that changes colors in response to the ammonia level or pH. Other suitable sensing membranes known to those of ordinary skill can be used in the present invention.

The camera detects data, such as the transmitted light, and a processor correlates the transmitted light to a pH or ammonia level, as described based on the sensed output. As illustrated in FIG. 3, the light source and camera can form a line that is substantially orthogonal to the receiving slot containing the sensor card with the light source and camera on opposite sides of the sensor card. Three points can also be used to define a plane that is substantially orthogonal to the receiving slot containing the sensor card with the light source and camera on opposite sides of the sensor card. Placing the light source and camera on opposite sides of the sensor card helps eliminate hot spots formed on the sensor card, increasing the accuracy of detection. Accuracy of the sensor can also be improved by making any portion of the interior surface of the receiving slot and/or sampling chamber non-reflective. Similarly, the sensor card surfaces can also be non-reflective to improve accuracy and related light detection properties. The interior surface of the receiving slot, sampling chamber, and/or the sensor card can be constructed or covered in a non-reflective material or colored in a non-reflective color, such as black.

The removable sensor card can be a disposable sensor card for use with a non-disposable fluid sensor apparatus. After each use, or if the sensor card is past useful life, the sensor card can be removed from the fluid sensor apparatus and replaced with a new sensor card.

Figure 4:
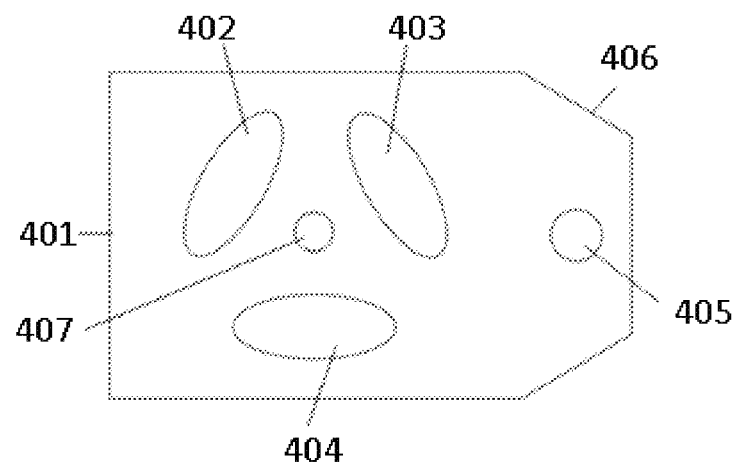
FIG. 4 shows a top view of a sensor card for use with a fluid sensor apparatus.

FIG. 4 illustrates a non-limiting embodiment of a sensor card 401 for use with the fluid sensor apparatus. The sensor card 401 can have three sensing membranes containing a colorimetric material. The sensing membranes can include any colorimetric material, including a high sensitivity ammonia sensing membrane 402, a low sensitivity ammonia sensing membrane 403, and a pH sensing membrane 404. The sensor card 401 can also include a reference sensing region 407. One of skill in the art will understand that any number of sensing membranes can be included in the sensor card, including 1, 2, 3, 4, 5, 6, or more sensing membranes of any type. Multiple sensing membranes of the same type can provide redundancy and further accuracy. As described, the sensor card 401 can include a hole 405 for equalizing pressure when fluid is flowed across both sides of the sensor card 401. The sensor card 401 can also have at least one tapered edge 406. As described, the tapered edge 406 can fit within a bevel in the receiving slot or receiving slot cover of the fluid sensor apparatus, further fixing the sensor card 401 in place.

Figure 5:
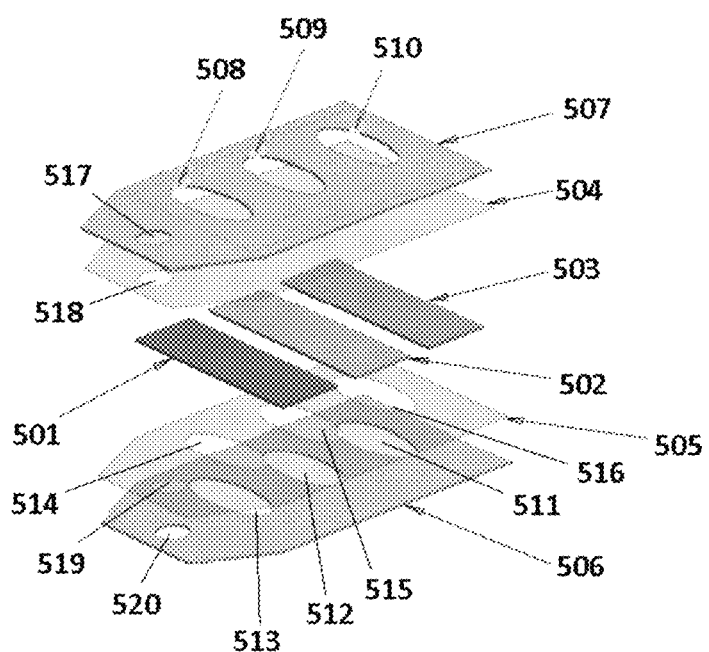
FIG. 5 shows an exploded view of a sensor card.

FIG. 5 illustrates an exploded view of a sensor card for use with the fluid sensor apparatus. The sensor card can include one or more sensing membranes, which can include any colorimetric material, including a high sensitivity ammonia sensing membrane 501, a low sensitivity ammonia sensing membrane 502, and a pH sensing membrane 503. The sensing membranes can have a dye embedded in or chemically bound to a substrate, the dye changing color in response to the pH or ammonia level of a fluid. The substrate can be any substrate known in the art capable of allowing gaseous ammonia through the substrate to contact the embedded dye, including polytetrafluoroethylene (PTFE), polyvinylidene difluoride (PVDF) and other fluorinated, hydrophobic polymers such as fluorinated ethylene propylene (FEP), and ethylene tetrafluoroethylene (ETFE). The gaseous ammonia penetrates the substrate and contacts the dye, altering the color of the dye. The ammonia sensitive dye can be any dye capable of changing color in response to the ammonia level, including bromophenol-blue, bromocreosol green, thymol blue, methyl crystal purple, chlorophenol, free-base porphyrins, Tetraphenylporphyrin (H2TPP), and combinations thereof. The pH sensitive dye can include Bromocresol Purple, Bromothymol Blue, Phenol Red, Thymol Blue, or combinations thereof.

The fluid sensor apparatus is not limited to use with sensor cards or sensor strips, and can be used with any substance that can produce a detectable change when exposed to a particular substance. The fluid sensor apparatus can detect color changes of the fluid flowing through the fluid sensor apparatus to determine if a chemical change occurs within the fluid, or to determine changes in the fluid composition. The fluid sensor apparatus can also be used to sense the clarity or color of the fluid.

The sensing membranes can be placed between two adhesive layers 504 and 505 interposed between a front carrier 507 and a back carrier 506, which overlay a front side and back side of the sensor card, respectively. The adhesive layers affix the sensing membranes to a front carrier 507 and back carrier 506. The adhesive layers and front and back carriers can include sampling holes to allow fluid to contact the fluid sensor membranes. The fluid sensor membrane can also detect gas and combinations of gases dissolved in the fluid. Although the term "fluid" is used in "fluid sensor membrane," the "fluid sensor membrane" is not limited to use with just fluids, but can also be used for gases and gases dissolved in fluid.

Sampling holes 508, 509, and 510 in front carrier 507 allow light and fluid to pass through the front carrier 507. Sampling holes 511, 512, and 513 allow light and fluid to pass through back carrier 506. Cut-outs 514, 515, and 516 allow light and fluid to pass through adhesive layer 505. Although not shown in FIG. 5, adhesive layer 504 also has cut-outs aligned with the fluid sensor membranes and sampling holes. As described, the sampling holes and cut-outs can be any shape, and need not be the same shape as the fluid sensor membranes. A hole can penetrate each layer of the sensor card, shown as hole 517 in front carrier 507, pressure equalizing hole 518 in adhesive 504, pressure equalizing hole 519 in adhesive 505, and pressure equalizing hole 520 in back carrier 506. As described the hole 517 acts to equalize pressure on both sides of the sensor card when fluid is flowing over both sides of the sensor card.

In addition to the sensing membranes illustrated in FIG. 5, the sensor card can also include a reference sensing region (not shown in FIG. 5). The reference sensing region can be a region of the sensor card colored in a solid color. As described, detection of green light transmitted through the sensor card may provide the most accurate sensing of pH and/or ammonia. The reference sensing region can be colored green, and used by the processor as a reference in determining the intensity of green light transmitted through the sensor card.

As described, the ammonia sensing region can sense an amount of ammonia in a fluid by sensing the amount of gaseous ammonia ($NH_3$) contacting the sensing membrane. The total ammonia concentration of the fluid includes ammonia as well as ammonium ions ($NH_4^+$). In certain fluids such as dialysate, the ammonium ions can account for the majority of the total ammonia in fluid. The $pK_a$ of ammonia depends on the temperature of the fluid and can be determined by a person skilled in the art for any temperature. With a known temperature, pH, and ammonia concentration, the ammonium ion concentration can be calculated using the Henderson-Hasselbalch equation. A temperature sensor can be included in the fluid sensing apparatus of the present invention. For example, a temperature sensor can be disposed in the sampling chamber of the described fluid sensor apparatus to allow for calculation of total ammonia. Alternatively, a temperature sensor can be positioned either upstream or downstream of the fluid sensor apparatus in a fluid flow path to obtain a temperature reading. One of skill in the art will understand that the processor can determine the total ammonia concentration of the fluid based on the sensed ammonia concentration, the temperature, and the pH.

Figure 17:
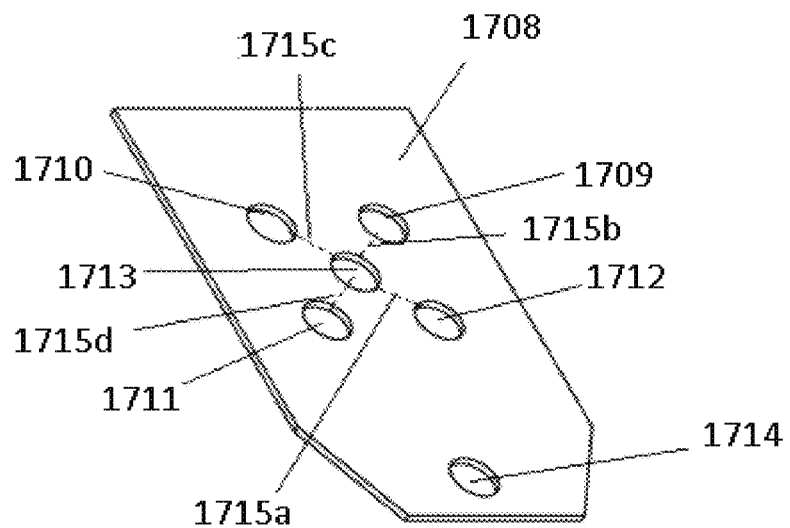
FIG. 17 shows a non-limiting embodiment of a sensor card.

FIG. 17 illustrates a sensor card 1708 with four sampling holes 1709, 1710, 1711, and 1712 positioned symmetrically around axis perpendicular to the sensor card 1708 and equidistant from the axis, as shown by dashed lines 1715a, 1715b, 1715c, and 1715d. Optional reference sensing region 1713 can be included at any location. A pressure equalizing hole 1714 can be included equalize the fluid pressure on each side of the sensor card 1708 in the sensor apparatus. Any number of sampling holes can be included in any sensor card, including 2, 3, 4, 5, 6, 7, or more.

Figure 18:
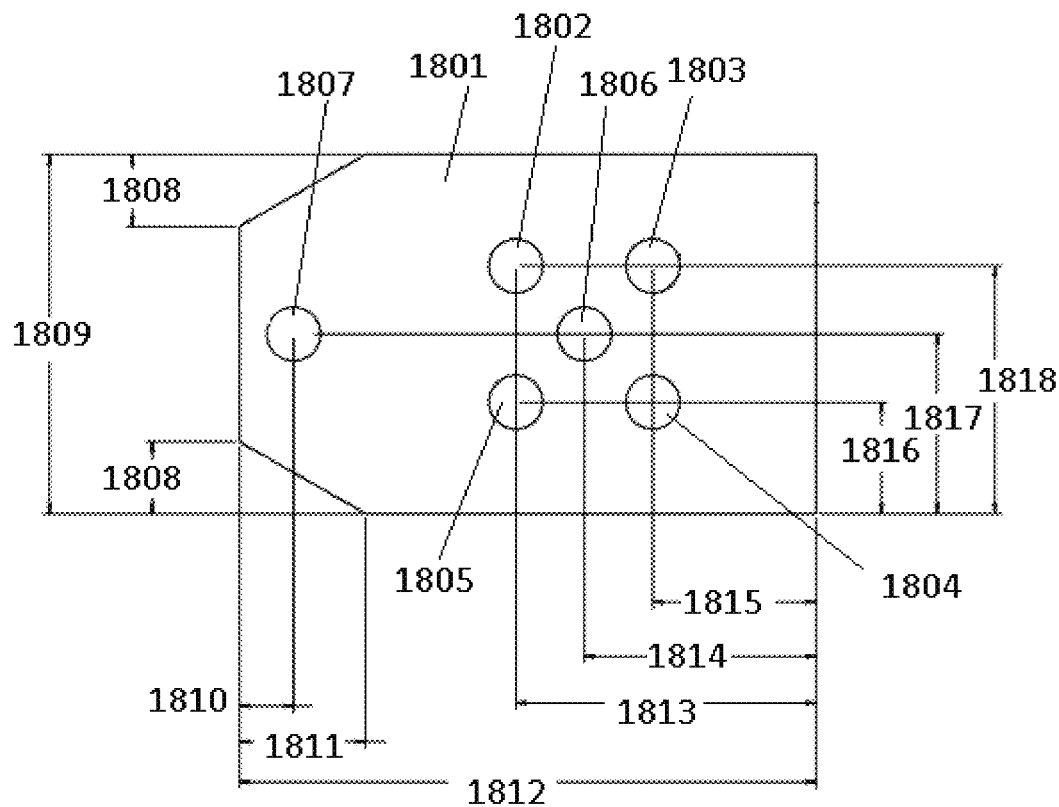
FIG. 18 shows a schematic of a sensor card.

FIG. 18 illustrates a non-limiting schematic of a sensor card 1801. The sensor card 1801 can include four sampling holes 1802, 1803, 1804, and 1805, as well as reference sensing region 1806. Alternatively, each of 1802, 1803, 1804, 1805, and 1806 can each be sampling holes, with a separate reference sensing region optionally provided. Further, any number of sampling holes and reference sensing regions can be included. For example, the sensor card 1801 can have two reference sensing regions and three sampling holes, three reference sensing regions and two sampling holes, or four reference sensing regions and one sampling hole. The sampling holes can overlay fluid sensor membranes or other colorimetric materials disposed inside the sensor card 1801, including a high sensitivity ammonia sensor membrane, a low sensitivity ammonia sensor membrane, and a pH sensor membrane, or any combination thereof. One of skill in the art will understand that the order of the fluid sensor membranes can be changed. Pressure equalizing hole 1807 can equalize the fluid pressure on either side of the sensor card during use. The sensor card can be any length, shown as distance 1812, including between 16 and 48 mm. The sensor card can be any width, shown as distance 1809, including between 10 and 30 mm. The sensor card 1801 can include at least one tapered edge, tapering inwardly along a side of the sensor card. The tapered edge can begin any distance from the end of the sensor card 1801, shown as distance 1811, including between 3.5 and 10.5 mm from the end of the sensor card 1801. The tapered edge can taper to any degree, shown as distance 1808, including between 2.0 and 6.0 mm from the side of the sensor card 1801. The pressure equalizing hole 1807 can be any distance from the end of the sensor card 1801, shown as distance 1810, including between 1.5 and 4.5 mm from the edge of the sensor card 1801.

The sensor card 1801 can include each of the sampling holes 1802-1805 concentrically arranged about an axis perpendicular to the sensor card 1801, with the reference sensing region 1806 at the axis. The sampling holes 1802 and 1805 can be any distance from the bottom of the sensor card, shown as distance 1813, including between 25 and 8.0 mm. The reference sensing region 1806 can be any distance from the bottom of the sensor card, shown as distance 1814, including between 19 and 6.5 mm. The sampling holes 1803 and 1804 can be any distance from the bottom of the sensor card, shown as distance 1813, including between 4.5 and 13.6 mm. Sampling holes 1804 and 1805 can be positioned any distance from the side of the sensor card, shown as distance 1816, including between 3.1 and 9.3 mm. The reference sensing region 1806 can be positioned any distance from the side of the sensor card, shown as distance 1817, including between 5.0 and 15.0 mm. Sampling holes 1802 and 1803 can be positioned any distance from the side of the sensor card, shown as distance 1818, including between 21 and 6.9 mm.

The fluid sensor apparatus can be used in any application where accurate measurement of solute concentrations, such as pH and/or ammonia level, is needed. The fluid sensor apparatus can measure the pH and/or solute level of a fluid either continuously or intermittently. The fluid sensor apparatus can be fluidly connected to a fluid flow path, and images of the sensing membranes can be taken by the camera as needed.

The fluid sensor apparatus can also be used to optically sample a fluid to determine a color, clarity, or cloudiness of the fluid. The sensor card can be removed to only have fluid flowing through the sensor apparatus. Alternatively, the fluid sensor apparatus can be constructed without a receiving slot for a sensor card, and only used for determining the color, clarity, and/or cloudiness of a fluid.

When used without a sensor card, the light source can emit light through the fluid sensor apparatus, and the light can be detected by a photodetector or camera on the opposite side of the fluid sensor apparatus. The color or clarity of a fluid sample can be obtained by transmitting radiant light or energy into the sample and then detecting the radiant light or energy after the light or energy has passed through a portion of the sample. For example, wavelengths of light emitted through the fluid and detected by the photodetector can determine the color of the fluid. If white light is emitted through the fluid, a detected decrease in the amount of red light on the opposite side of the fluid would indicate that red light is either being reflected or absorbed by the fluid. Based on the wavelengths of visible or non-visible light emitted and detected, the color of the fluid can be determined. A decrease in intensity of light from the light source to the photodetector can determine the clarity or cloudiness of the fluid. For example, if the detected light has an intensity 10% lower than the emitted light, the fluid absorbs or reflects 10% of the emitted light, indicating a lack of clarity or cloudiness in the fluid. Any change in intensity of light can be detected including a change of between 1 and 50%, between 1 and 5%, between 1 and 10%, between 5 and 10%, between 5 and 20%, between 10 and 25%, between 15 and 30%, between 15 and 40% or between 25 and 50%.

The color spectrum, clarity, and cloudiness of a fluid can be of particular use in peritoneal dialysis. A lack of clarity or cloudiness in peritoneal dialysate effluent drained from a patient may indicate infection in the peritoneum of the patient. Abnormal discoloration of the peritoneal dialysate effluent can also indicate protein or blood cell leakage through the peritoneal membrane of the patient, as well as fibrin in the peritoneum or increased triglycerides in the filtrate. In response to an abnormal discoloration or lack of clarity in the peritoneal dialysate effluent, a doctor or patient may be alerted to the possibility of infection or issues. An effluent line of a peritoneal dialysis cycler can be fluidly connected to the inlet of the fluid sensor apparatus, and the peritoneal dialysate effluent flowed through the fluid sensor apparatus to determine the color, clarity, or cloudiness of the fluid.

The color of the fluid can also be used as a quality check. For example, a discolored or cloudy fluid used in peritoneal dialysis could indicate that the composition of the fluid is incorrect. In response to an unexpected fluid composition, the system can alert the user or shut down to avoid infusing peritoneal dialysate having an incorrect composition into the patient. Further, based on the color of the fluid, the composition of the fluid can be determined. The processor can compare the expected composition to the actual determined composition and issue an alert or shut down if the determined composition of the fluid differs from the expected composition of the fluid by more than a predetermined amount.

Figure 6:
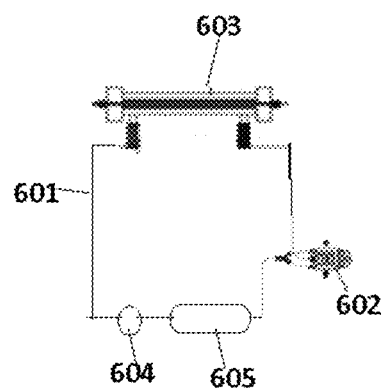
FIG. 6 shows a dialysate flow path including the fluid sensor apparatus.

One non-limiting application of the fluid sensor apparatus is dialysis. However, the fluid sensor apparatus can be used in any application with any clear aqueous liquid in which the composition, color, or clarity of the liquid is being determined. FIG. 6 illustrates a non-limiting exemplary embodiment of a dialysate flow path including the fluid sensor apparatus 602 fluidly connected to the dialysate flow path. One of skill in the art will understand that the dialysate flow path 601 illustrated in FIG. 6 is a simplified flow path, and that any number of additional components can be added as necessary. Dialysate pump 604 provides the driving force for flowing the dialysate through the dialysate flow path 601. Dialysate in the dialysate flow path 601 passes through a dialyzer 603. Blood from a patient is flowed through a blood flow path (not shown) and into the dialyzer 603. Solutes in the blood and dialysate can cross a semipermeable membrane in the dialyzer 603 to move from a high concentration side of the membrane to a low concentration side of the membrane. A principal waste product removed during dialysis is urea, which moves from the patient's blood into the dialysate in the dialyzer 603. The urea is removed from the dialysate in sorbent cartridge 605, which can contain urease to catalyze the conversion of urea to ammonium ions and carbonate ions. The ammonium ions can be removed by a cation exchange membrane or layer in the sorbent cartridge 605, as ammonia would be poisonous to pass back to the patient. Even though the ammonium ions are generally removed by the process, monitoring the presence of ammonium ions in dialysate fluid is desirable. One or more solute concentrations of a fluid can be determined by ammonia or ammonium ion concentration along with the pH of the fluid. A total ammonia content of a fluid can be determined by ammonia or ammonium ion concentration along with the pH of the fluid. The fluid sensor apparatus 602, containing a sensor card as described, can determine the ammonia level and ensure that the dialysate does not have an ammonia level in excess of a predetermined limit. The fluid sensor apparatus 602 can be placed downstream of the sorbent cartridge 605 and upstream of the dialyzer 603, allowing the ammonia level and pH of the dialysate to be determined after conversion of urea to ammonium ions, but prior to passing the dialysate back through the dialyzer 603. The fluid sensor apparatus 602 can determine the pH and ammonia level in any fluid used in dialysis, including a dialysis fluid, a peritoneal dialysis fluid, a hemodialysis fluid, or a rinseback fluid. Although illustrated in FIG. 6 as a hemodialysis system, the fluid sensor apparatus can also be used in peritoneal dialysis to determine the pH and ammonia level of any peritoneal dialysis fluid. As described, a temperature sensor can be included either within the fluid sensor apparatus 602, or at any place within the dialysate flow path 601.

The fluid sensor apparatus can also be used to detect substances in gaseous fluids in addition to aqueous solutions. For example, when used to detect ammonia, ammonia gas in an environment can produce a detectable change in the ammonia sensing membranes in either the gaseous or solution state. As a non-limiting example, the fluid sensor apparatus can be used to detect ammonia in a refrigerated room where ammonia is used as the refrigerant. Air can flow over the sensors within the fluid sensor apparatus, and the presence of ammonia will produce a detectable change in the ammonia sensing membranes. The air flow through the fluid sensor apparatus can be active or passive. A fan can be included in the fluid sensor apparatus for active gas flow across the sensors.

To test the accuracy of the fluid sensor apparatus, several experiments were conducted. For each experiment, two parallel sensor cells were tested in each run. The sensor cards used had three identical films (pH, $NH_3$ low sensitivity, or $NH_4$ high sensitivity), as well as a color reference sensing region. The test setup provided six replicated measurements per run. The sensor cards were preconditioned to simulate the system start up. The preconditioning included agitating the sensor cards in 35 mM NaOH and 10% citric acid at room temperature for 12 minutes, agitating the sensor cards in 35 mM NaOH at room temperature for 9 minutes, agitating the sensor cards in 35 mM NaOH in phosphate buffered saline (PBS) at 37° C. for 5 minutes, and agitating the sensor cards in PBS at 37° C. for 15 minutes. The test runs were conducted in phosphate buffered saline (PBS) at 37° C., and a flow rate of 325 ml/min, unless otherwise stated. Previous tests have shown that sensor performance in PBS is the same as in simulated dialysate. The pH of the PBS was controlled by addition of HCl or NaOH. The ammonia level was controlled by addition of ammonium chloride. The ammonium chloride concentration was only adjusted upward, however, the ammonia level can move up or down depending on the pH and temperature. The test runs were conducted for between 5-10 hours, depending on the number of data points collected. The pH was measured versus a lab reference. The ammonia level is computed assuming the ammonium chloride concentration and the pH values. The assumptions correlated well with the true ammonium chloride concentration as determined by laboratory testing of collected samples. The images were collected every four seconds and the red, green, and blue values (RGB) determined for the regions of interest (mean ROI, 1500 pixels). Each test point was stabilized for 1 minute and collected for a minimum of three minutes. The RGB values are the average of the mean ROI values over the three minutes.

Experiment 1

Figure 7A:
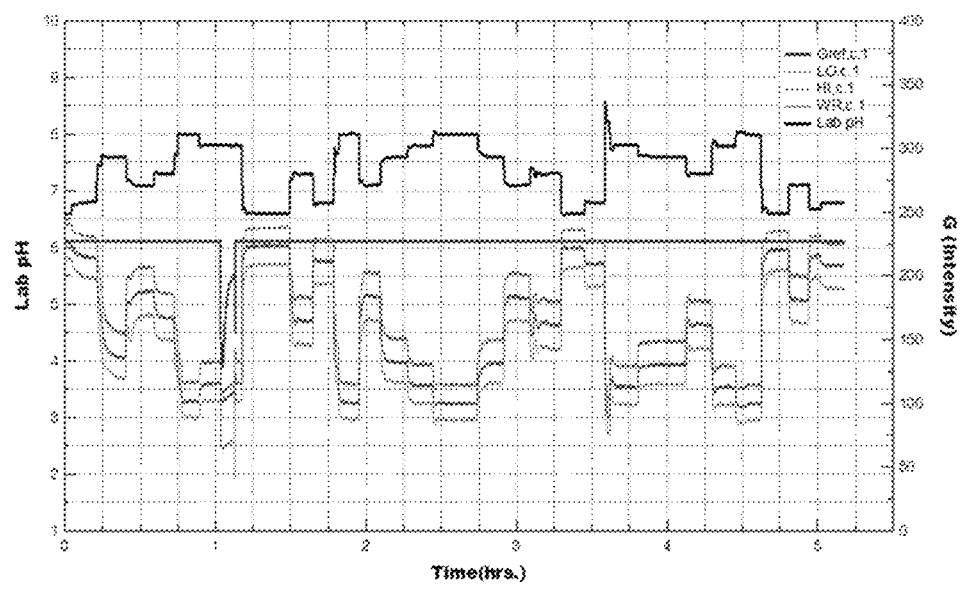
FIGS. 7A-B show plots of the intensity of green light detected by a pH sensing membrane in the fluid sensor apparatus as a function of pH and time.
Figure 7B:
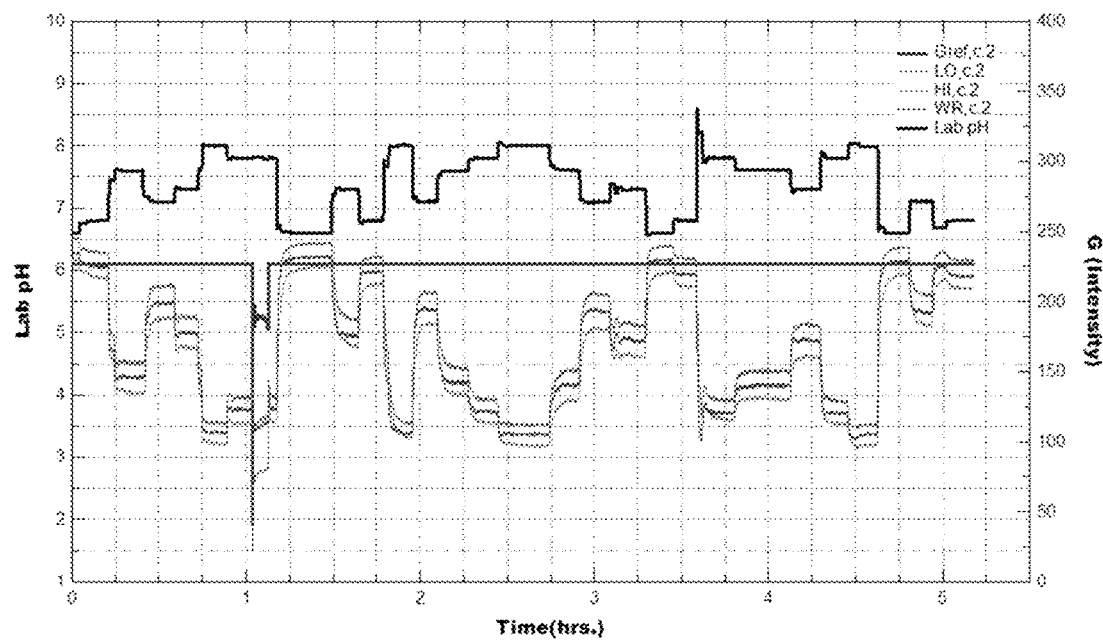

Prior test results established that detecting green light can provide high accuracy for the sensor cards. FIGS. 7A and 7B illustrate the detected intensity of green light as a function of the pH of the fluid and time for two different sensor cards. The top black line in each graph is the lab tested pH of the fluid. The straight black line represents a green colored reference sensing region on the sensor cards. The light gray, medium gray, and dark gray lines at the bottom of the graphs are the detected green light intensity for each of the three pH sensing membranes. As illustrated in FIGS. 7A and 7B, the intensity of the green light correlates well with the lab tested pH of the fluid for each sensor card. However, the green light as detected for each of the pH sensing membranes varied, as illustrated by the three different gray lines in each graph. Further, a difference exists in the detected green light intensity between each sensor card, as illustrated in a comparison of FIG. 7A with FIG. 7B. Differences between films on a single card and between cards in different fluid sensor aparati are caused by non-uniform backlighting and highlight the need for a uniform backlight.

Figure 8:
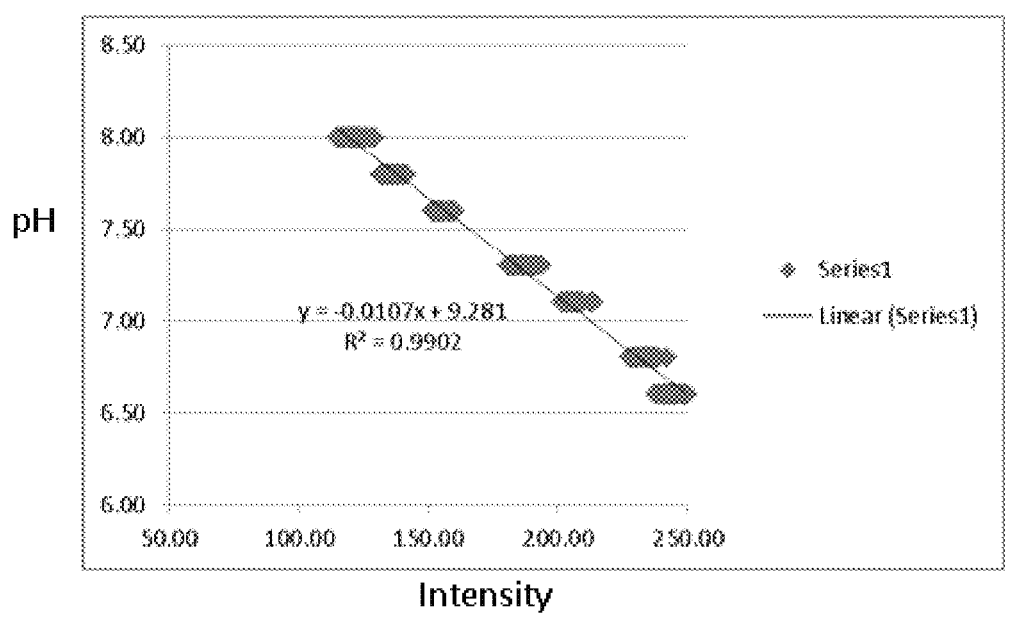
FIG. 8 shows fitting of the detected green light intensity relative to pH of the fluid detected for a pH sensing membrane.

FIG. 8 illustrates the correlation between green light intensity as detected by the camera described and the lab tested pH values of the fluid for a pH sensor card. The green light as detected for each of the three pH sensing membranes on the sensor card is shown as the data points in FIG. 8. As illustrated in FIG. 8, the green light intensity increases with decreasing pH in a largely linear fashion. However, significant spread exists for each of the lots at each test point, indicating different intensities detected for each pH sensing membrane, likely due to non-uniform backlighting. Further, the fit differs slightly for each of the three lots tested. A linear regression for the sensor card provided the change in green light intensity as a function of pH to be $y=-0.0107x+9.281$ with an $R^2$ value of 0.9902.

Experiment 2

Figure 9A:
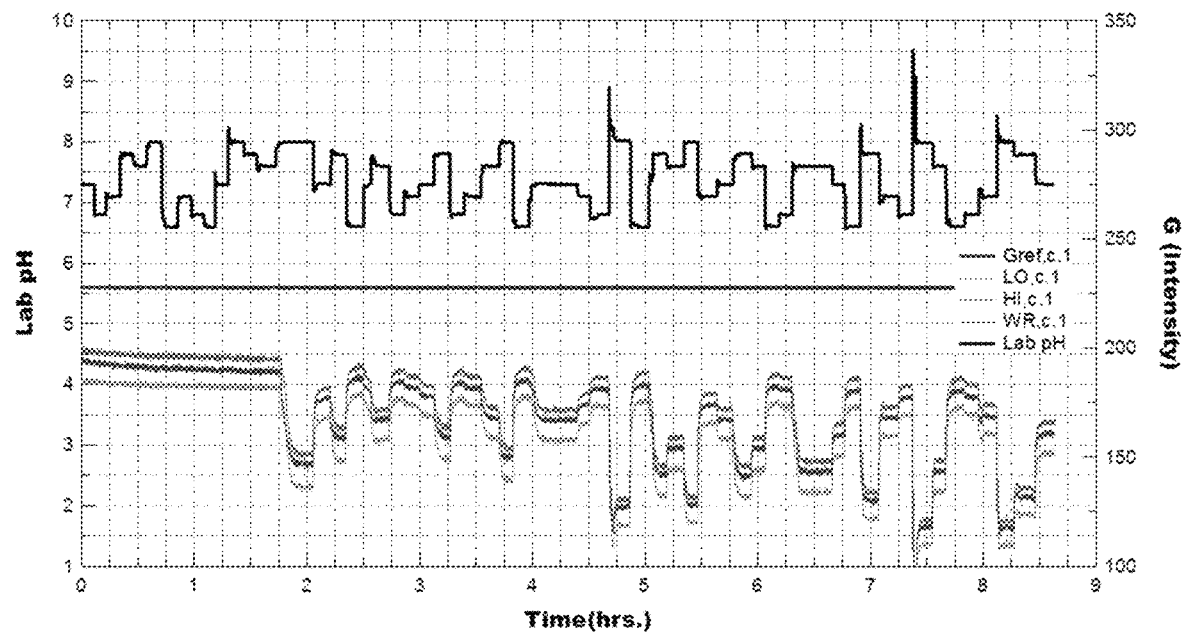
FIGS. 9A-B show the detected intensity of green light as a function of the pH of the fluid and time, as detected for a low sensitivity ammonia sensing membrane.
Figure 9B:
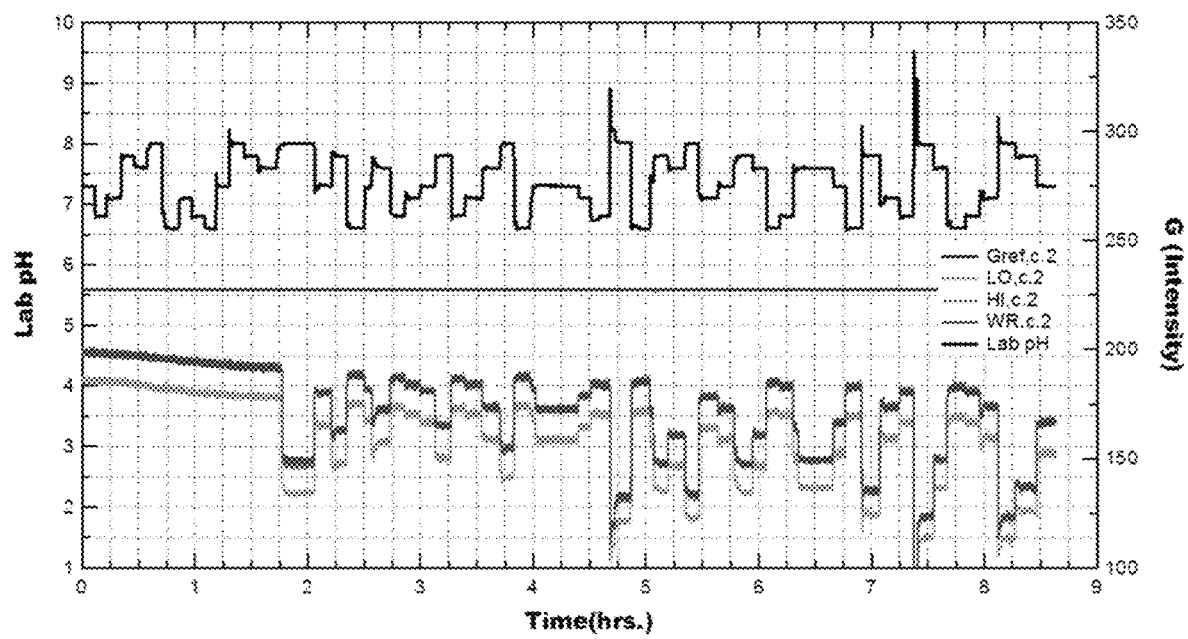

FIGS. 9A and 9B illustrate the detected intensity of green light as a function of the pH of the fluid and time, as detected for a low sensitivity ammonia sensing membrane. The graph in FIG. 9A was obtained using a first sensor card with three ammonia sensing regions, and the graph in FIG. 9B was obtained using a second sensor card with three ammonia sensing regions. The ammonia level in the fluid is altered as a function of the pH. The top black line in each graph is the lab tested pH of the fluid. The straight black line represents a green colored reference sensing region on the sensor cards. The light gray, medium gray, and dark gray lines on the bottom of the graph are the detected green light intensity for each of the three low sensitivity ammonia sensing membranes on each sensor card. As illustrated in FIGS. 9A and 9B, the intensity of the green light correlates well with the lab tested pH of the fluid, and thus with the ammonia level. However, the green light as detected for each of the low sensitivity ammonia sensing membranes varied, as illustrated by the three different green lines in each of FIGS. 9A and 9B. Further, a difference exists in the detected green light intensity between each sensor card, as illustrated in a comparison of FIG. 9A with FIG. 9B. Again, these differences are due to non-uniform backlighting.

Figure 10:
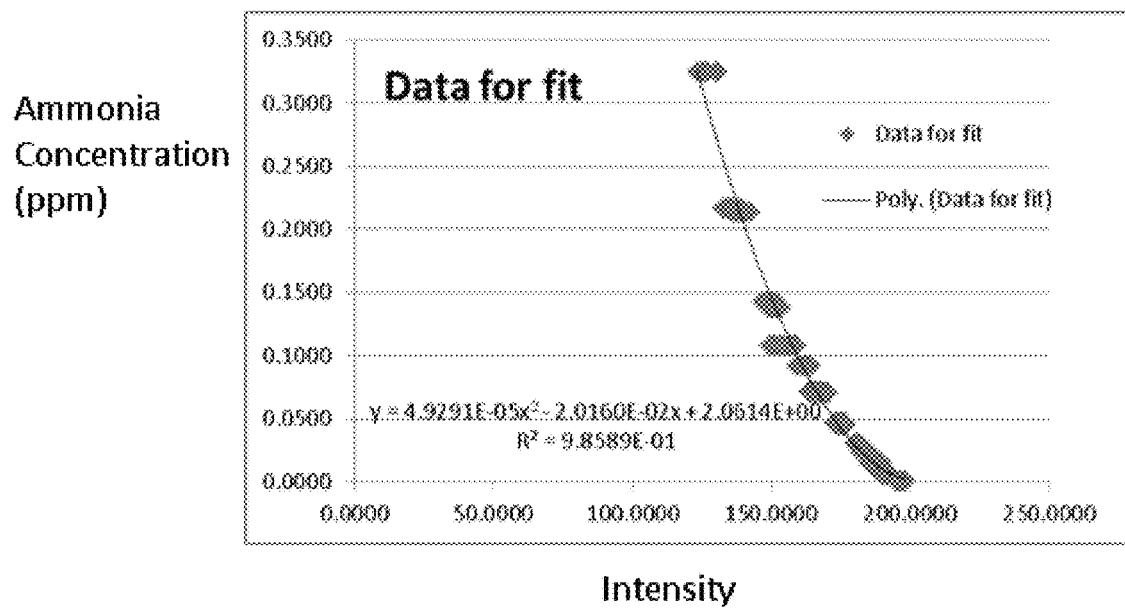
FIG. 10 shows fitting of the detected green light intensity relative to the ammonia concentration of the fluid as detected for a low sensitivity ammonia sensing membrane.

FIG. 10 illustrates the correlation between green light intensity as detected by the camera described and the calculated ammonia values of the fluid for the low sensitivity ammonia sensing membranes. The green light as detected for each of the three low sensitivity ammonia sensing membranes is shown as the data points in FIG. 10. As illustrated in FIG. 10, the green light intensity decreases with increasing ammonia levels. A small spread exists for each test point, indicating different intensities detected for each of the three low sensitivity ammonia sensing membranes on the sensor card, likely due to non-uniform backlighting. A polynomial regression provided the correlation between green light intensity and ammonia concentration as $y=4.9291*10^{-5}(X^2)-2.0160*10^{-2}(X)+2.0614*10^0$, with an $R^2$ value of $9.8589*10^{-1}$. Based on the data presented in FIG. 10, the low sensitivity ammonia sensing membrane can be used for detecting the ammonia level at greater than 0.05 ppm.

Experiment 3

Figure 11A:
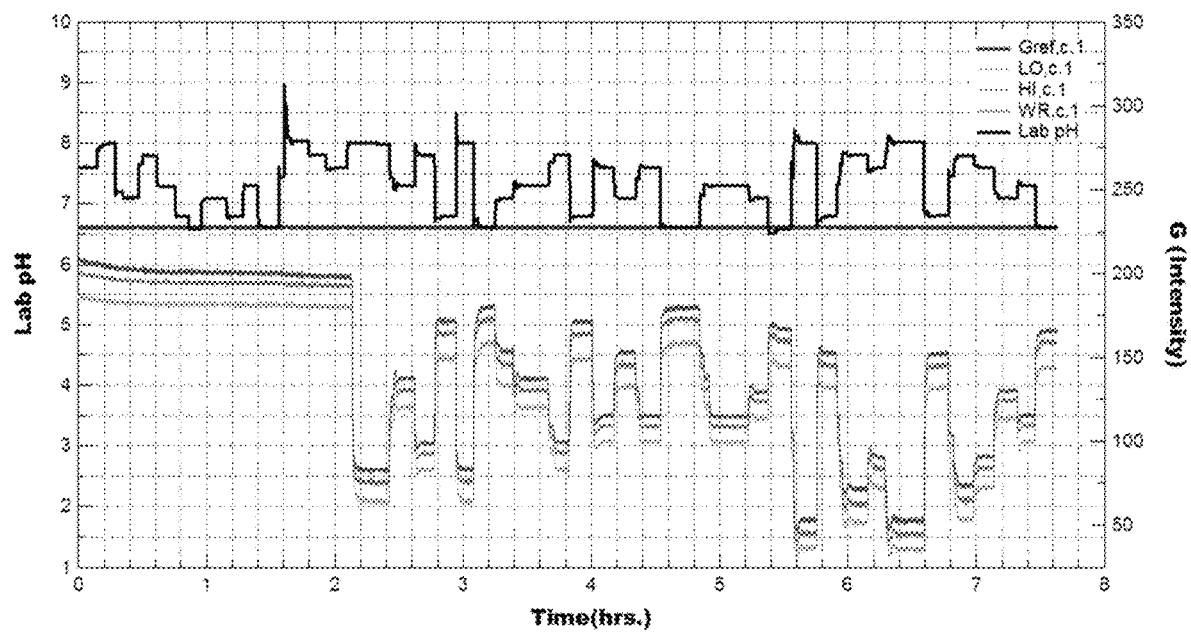
FIGS. 11A-B show the detected intensity of green light as a function of the pH of the fluid and time, as detected for a high sensitivity ammonia sensing membrane.
Figure 11B:
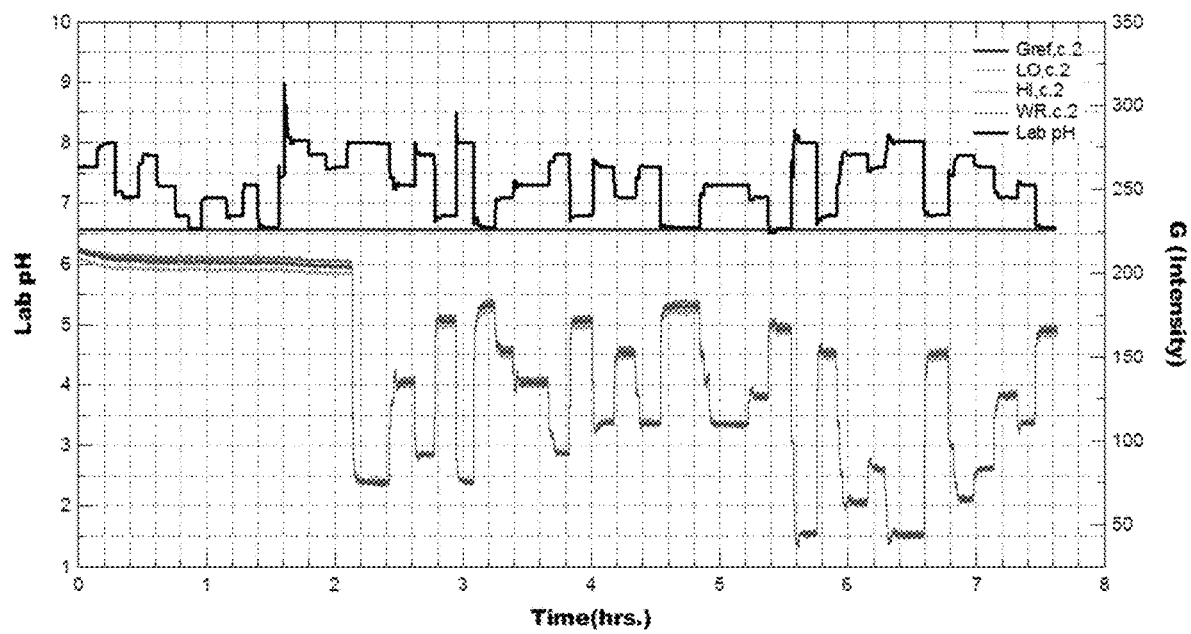

FIGS. 11A and 11B illustrate the detected intensity of green light as a function of the pH of the fluid and time, as detected for a high sensitivity ammonia sensing membrane. The graph in FIG. 11A was obtained using a first sensor card with three high sensitivity ammonia sensing membranes, and the graph in FIG. 11B was obtained using a second sensor card with three high sensitivity ammonia sensing regions. The ammonia level in the fluid is altered as a function of the pH. The top black line in each graph is the lab tested pH of the fluid. The straight black line in each graph represents a green colored reference sensing region on the sensor cards. The light gray, medium gray, and dark gray lines at the bottom of each graph are the detected green light intensity for each of the three high sensitivity ammonia sensing membranes on each sensor card. As illustrated in FIGS. 11A and 11B, the intensity of the green light correlates well with the lab tested pH of the fluid, and thus with the ammonia level for each of the two sensor cards. However, the green light as detected for each of the high sensitivity ammonia sensing membranes varied, as illustrated by the three different green lines in each graph, although the graph illustrated in FIG. 11B shows only a slight variation between high sensitivity ammonia sensing membranes. Further, a difference exists in the detected green light intensity between each sensor card, as illustrated in a comparison of FIG. 11A with FIG. 11B. Again, the differences are due to non-uniform backlighting.

Figure 12:
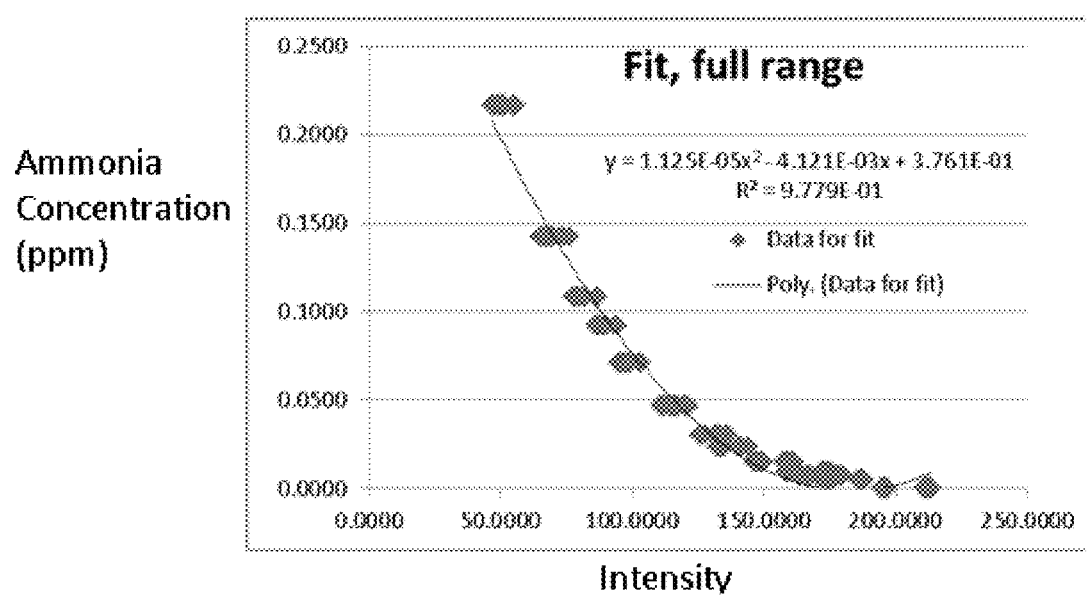
FIG. 12 shows fitting of the detected green light intensity relative to the ammonia concentration of the fluid as detected for a high sensitivity ammonia sensing membrane.

FIG. 12 illustrates the correlation between green light intensity as detected by the camera described and the calculated ammonia level of the fluid for a high sensitivity ammonia sensor card having three high sensitivity ammonia sensing membranes. The green light as detected for each of the three high sensitivity ammonia sensing membranes is shown as the data points in FIG. 12. As illustrated in FIG. 12, the green light intensity increases with decreasing ammonia level. However, significant spread exists for each test point, indicating different intensities detected for each pH sensing membrane, likely due to non-uniform backlighting, particularly at high ammonia levels. A polynomial regression for the sensor card provided the change in green light intensity as a function of ammonia concentration to be $y=1.125*10^{-5}(X^2)-4.121*10^{-3}(X)+3.761*10^{-1}$, with an $R^2$ value of $9.779*10^{-1}$. A polynomial regression for the sensor card of the second lot, illustrated in FIG. 12B provided the change in green light intensity as a function of ammonia concentration to be $y=1.027*10^{-5}(X^2)-3.424*10^{-3}(X)+2.862*10^{-1}$, with an $R^2$ value of $9.682*10^{-1}$. A linear regression for the sensor card of the third lot, illustrated in FIG. 12C provided the change in green light intensity as a function of pH to be $y=1.041*10^{-5}(X^2)-3.823*10^{-3}(X)+3.508*10^{-1}$, with an $R^2$ value of $9.720*10^{-1}$.

Figure 13:
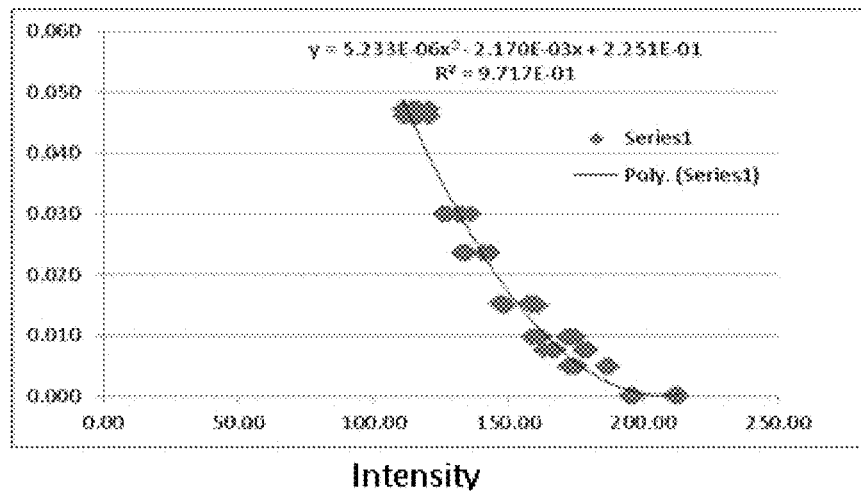
FIG. 13 shows fitting of the detected green light intensity relative to the ammonia concentration of the fluid as detected for a high sensitivity ammonia sensing membrane for a small range of ammonia concentrations.

FIG. 13 illustrates the correlation between green light intensity as detected by the camera described and the calculated ammonia level of the fluid for a high sensitivity ammonia sensor card at ammonia levels less than 0.05 ppm. The green light as detected for each of the three high sensitivity ammonia sensing membranes is shown as the data points in FIG. 13. As illustrated in FIG. 13, the sensor cards are more accurate at ammonia levels less than 0.05 ppm as shown by the increase in the $R^2$ value from 0.968 in FIG. 12 to 0.972 in FIG. 13. Cell-to-cell performance differences are visible in the reduced range illustrated in FIG. 13. A polynomial regression for the sensor card provided the change in green light intensity as a function of ammonia concentration to be $y=5.233*10^{-6}(X^2)-2.170*10^{-3}(X)+2.251*10^{-1}$, with an $R^2$ value of $9.717*10^{-1}$.

Experiment 4

Figure 14A:
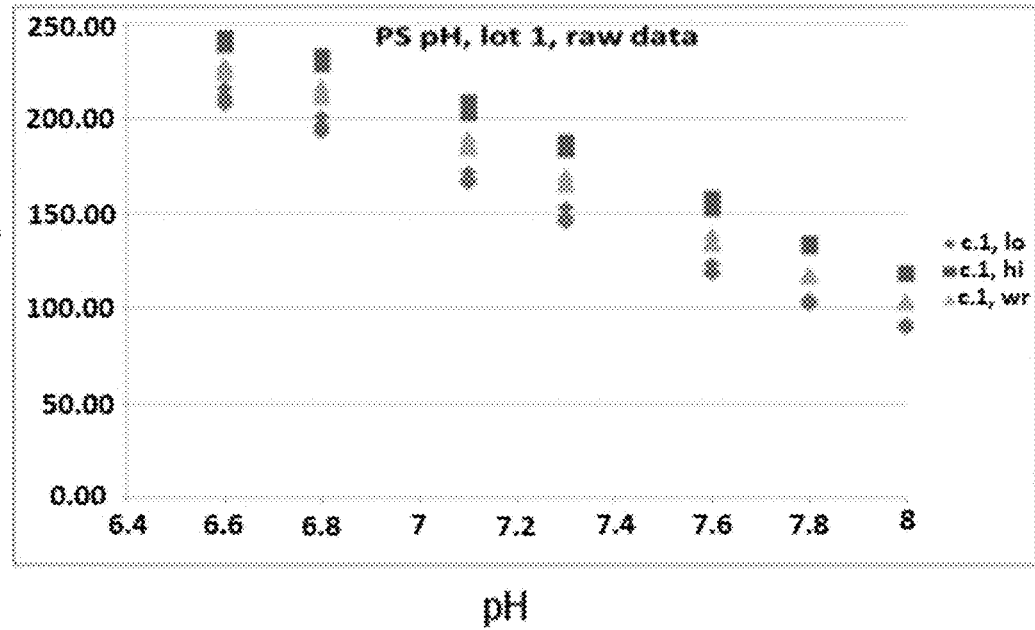
FIGS. 14A-B shows the effects of uniform backlighting on the detected green light intensity for pH sensing membranes on a sensor card.
Figure 14B:
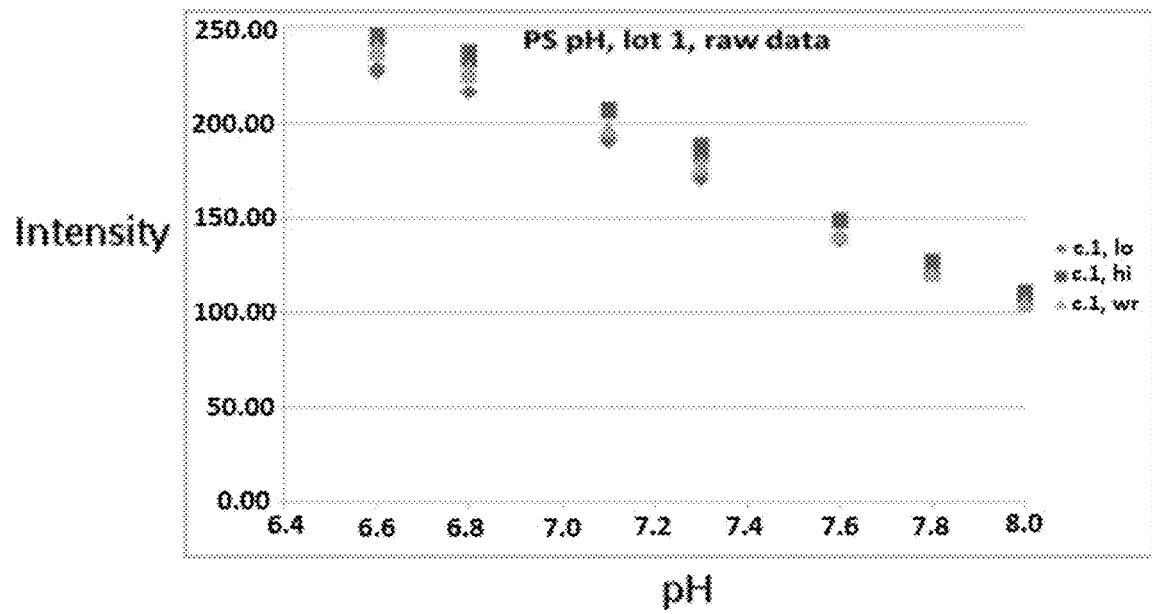

To test the effects of uniform backlighting on each of the pH sensing membranes in a sensor card having three pH sensing membranes, an LED array was constructed for the pH and ammonia sensing flow apparatus that provides a uniform backlight on all three sensing membranes. FIG. 14A illustrates the intensity of green light detected from each of the three pH sensing membranes without uniform backlighting. A first pH sensing membrane at a first location on the sensor card is represented as the squares in FIG. 14A labeled c.1 hi, a second pH sensing membrane at a second location on the sensor card is represented as the triangles labeled c.1 wr, and a third pH sensing membrane at a third location on the sensor card is represented by the diamonds labeled c.1 lo. FIG. 14B illustrates the intensity of green light detected from each of the three pH sensing membranes with uniform backlighting. A first pH sensing membrane at a first location on the sensor card is represented as the squares in FIG. 14B labeled c.1 hi, a second pH sensing membrane at a second location on the sensor card is represented as the triangles labeled c.1 wr, and a third pH sensing membrane at a third location on the sensor card is represented by the diamonds labeled c.1 lo. As illustrated by a comparison of FIG. 14A to 14B, more uniform backlighting provides less variation between the three pH sensing membranes, as the intensities of light transmitted through each of the pH sensing membranes of FIG. 14B are closer together. However, the backlight used was not sufficiently uniform to remove all variation.

Experiment 5

Figure 15A:
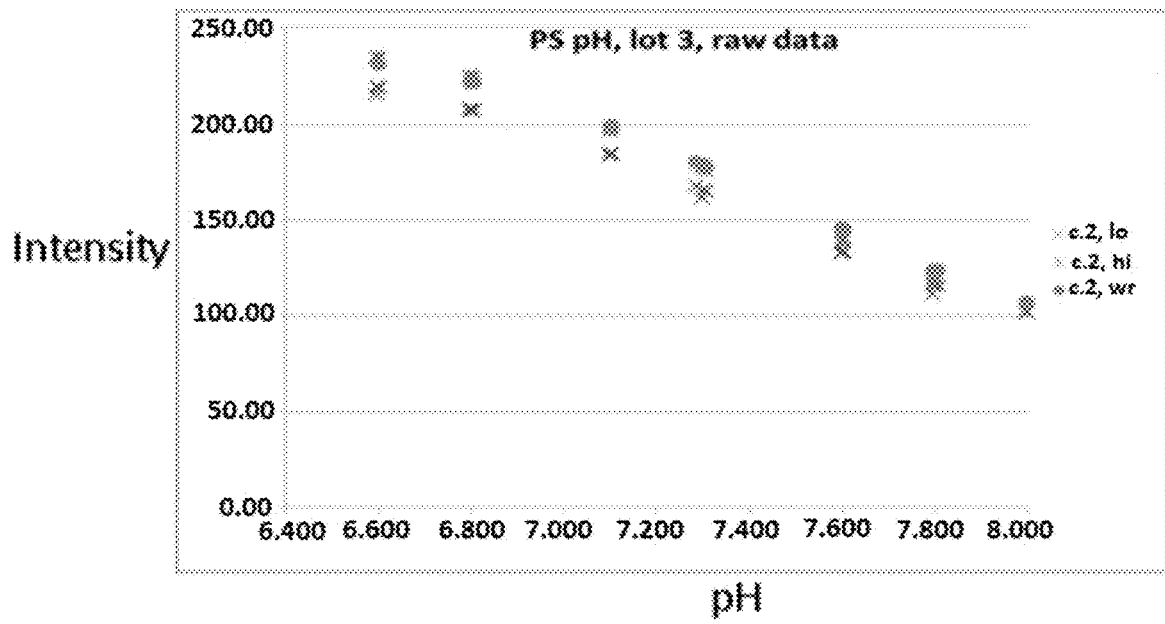
FIGS. 15A-B show the effects of symmetrical sensing membrane and window placement on the detected green light intensity for pH sensing membranes on a sensor card.
Figure 15B:
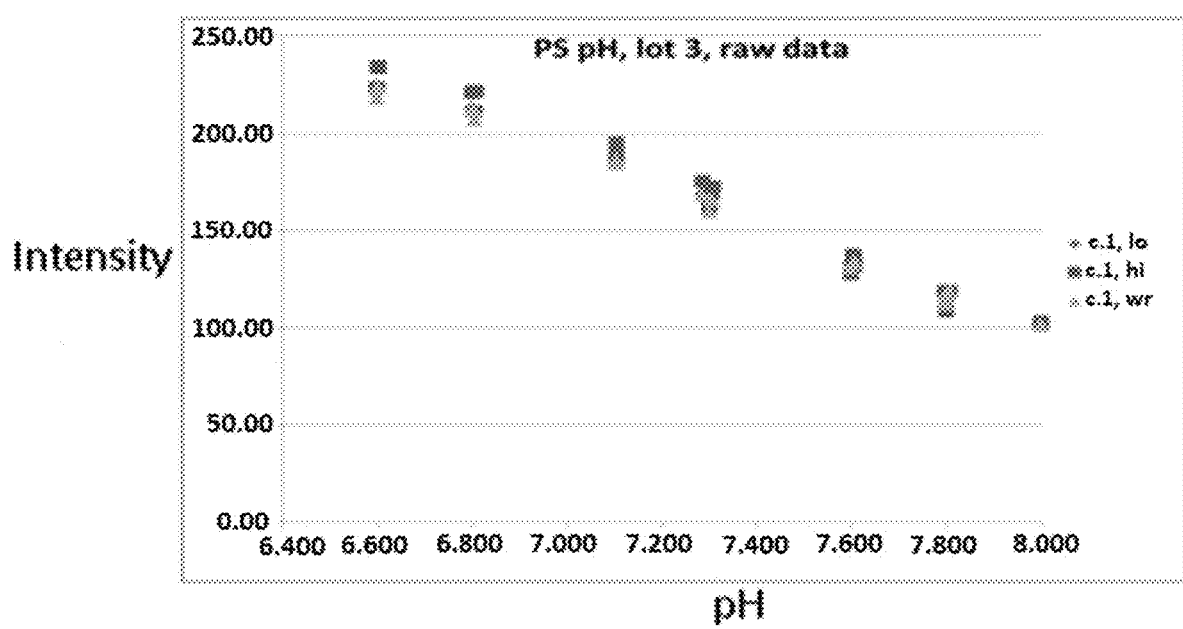

To test whether the remaining variation in the pH sensing membranes may be due to spherical lens aberration, the pH sensing membranes and windows on a sensor card were arranged symmetrically about a center axis through the sensor card, with each pH sensing membrane and window equidistant from the center axis. FIG. 15A illustrates the intensity of green light detected from each of the three pH sensing membranes without a uniform backlight, but with a symmetric pH sensing membrane and window arrangement. The light gray X's in FIG. 15A represent the detected light transmitted through a first pH sensing membrane at a first location on the sensor card labeled c.2 lo, the circles represent the light transmitted through a second pH sensing membrane at a second location on the sensor card labeled c.2 wr, and the dark gray X's represent the light transmitted through the third pH sensing membrane at a third location on the sensor card labeled c.2 hi. FIG. 15B illustrates the intensity of green light detected from each of the three pH sensing membranes with a uniform backlight and with a symmetrical placement of the pH sensing membranes about a center axis, and equidistant to the center axis, of the sensor card. The diamonds in FIG. 15B represent the detected light transmitted through a first pH sensing membrane at a first location on the sensor card labeled c.1 lo, the squares represent the light transmitted through a second pH sensing membrane at a second location on the sensor card labeled c.1 hi, and the triangles represent the light transmitted through the third pH sensing membrane at a third location on the sensor card labeled c.1 wr. A symmetrical pH sensing membrane and window placement provides superior uniformity in the intensity of green light detected even without uniform backlighting, as the data points from each of the pH sensing membranes in FIG. 15A are closer together than without a symmetrical placement, as illustrated in a comparison of FIGS. 14A and 15A. The combination of uniform backlighting and a symmetrical pH sensing membrane and window placement provides the most consistent light intensity across the three pH sensing membranes, as illustrated in a comparison of FIGS. 15A and 15B, with the data in FIG. 15B providing the closest match between the three sensing membranes.

Experiment 6

Figure 16:
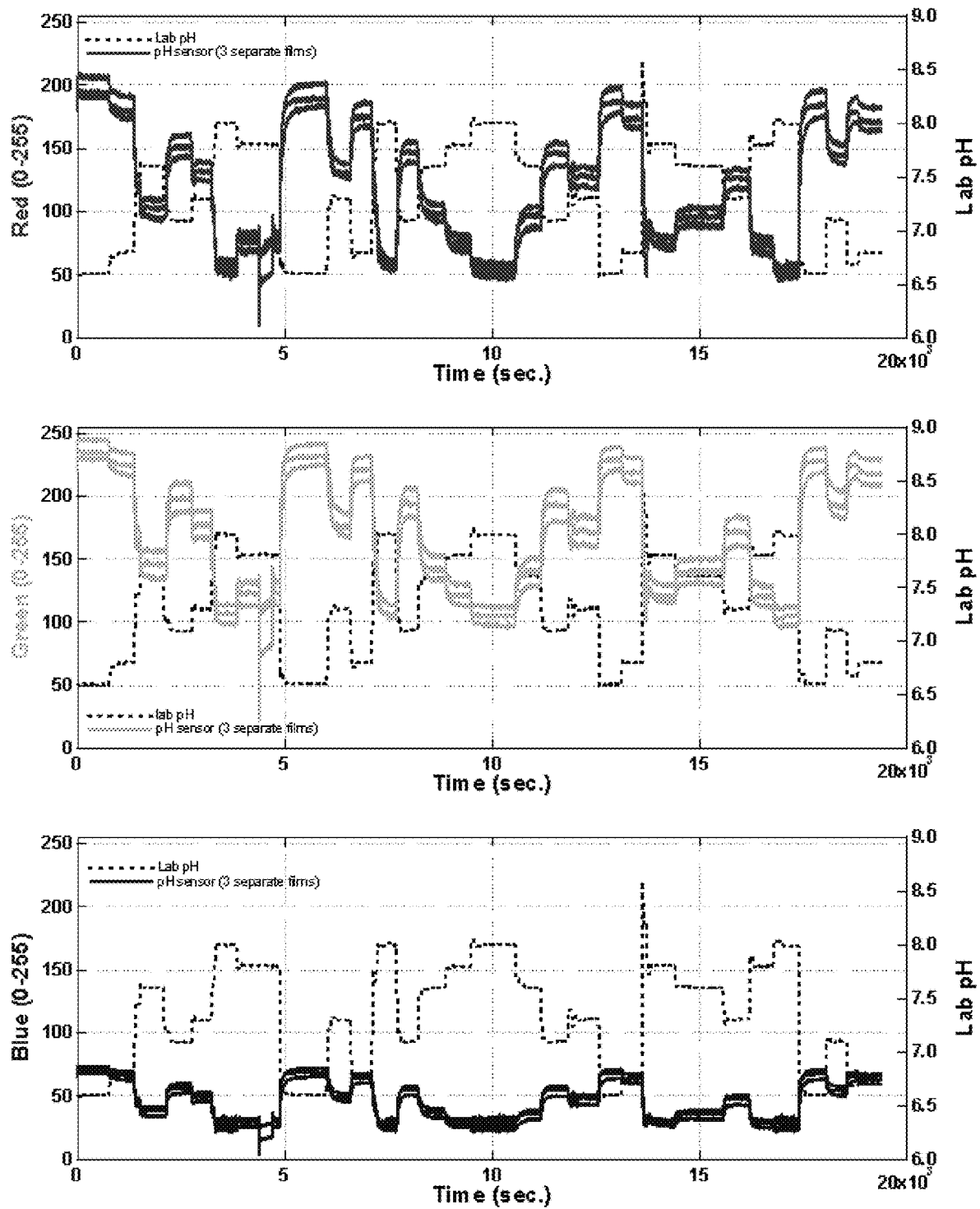
FIG. 16 shows effects of pH on the intensity of red, green, and blue light transmitted through pH sensing membranes.

Experiments 1-5 illustrate sensors that detect the intensity of green light transmitted through each of the sensing membranes. However, red or blue light can also determine the pH and ammonia level of a fluid. FIG. 16 illustrates the correlation between red, blue, and green light and the pH. The data illustrated in FIG. 16 was taken at 37° C. at 325 mL/min in PBS. The top graph of FIG. 16 is the correlation between red light transmitted through the sensor card and the pH for three different pH sensor membranes on a single sensor card, the middle graph is the correlation between green light transmitted through the sensor card and pH for three different pH sensor membranes on a single sensor card, and the bottom graph is the correlation between blue light transmitted through the sensor card and pH for three different pH sensor membranes on a single sensor card. In each graph, three separate pH sensor membranes were used. Each graph shows the same three pH sensor membranes. Each graph shows the red, green, or blue data as a solid line for each of the three pH sensor membranes versus time compared to a dotted line for lab pH vs. time. All three color signals respond to changes in pH, with the intensity of transmitted light inversely proportional to the pH. Experiments have shown the same results for ammonia sensor films. Although red, green, or blue light can be used, in a preferred embodiment the system uses green light because green light provides the highest signal vs. pH or ammonia change slope and thus the best sensitivity.

One skilled in the art will understand that various combinations and/or modifications and variations can be made in the described systems and methods depending upon the specific needs for operation. Features illustrated or described as being part of an aspect of the invention may be used in the aspect of the invention, either alone or in combination.

We claim:

1. A fluid sensor apparatus, comprising:
   at least one fluid inlet;
   at least two fluid outlets in fluid communication with the at least one fluid inlet;
   a receiving slot for receiving a sensor card in fluid communication with the fluid inlet and the at least two fluid outlets;
   a sampling chamber in fluid communication with the fluid inlet, the at least two fluid outlets, and the receiving slot;
   a light source directing light to a first side of the receiving slot; and
   a camera or a photodetector receiving light from a second side of the receiving slot opposing the first side of the receiving slot;
   wherein the at least one fluid inlet fluidly connects the receiving slot to an external fluid flow path and wherein an opening of each of the at least two fluid outlets resides at a connect of each of the fluid outlets and the sampling chamber to fluidly connect the receiving slot to the external fluid flow path.

2. The fluid sensor apparatus of claim 1, wherein the light source is positioned on the first side of the receiving slot opposite to the camera or photodetector positioned on the second side of the receiving slot.

3. The fluid sensor apparatus of claim 1, further comprising a first light guide directing light from the light source to the first side of the receiving slot and a second light guide directing light received on the second side of the receiving slot directing light to the camera or photodetector.

4. The fluid sensor apparatus of claim 1, wherein the light source is an LED array.

5. The fluid sensor apparatus of claim 1, further comprising a receiving slot cover.

6. The fluid sensor apparatus of claim 1, wherein an interior surface of the receiving slot is non-reflective.

7. The fluid sensor apparatus of claim 5, further comprising a receiving slot cover lock; the receiving slot cover lock fixing the receiving slot cover in a fixed position.

8. The fluid sensor apparatus of claim 1, wherein the camera or photodetector and light source define a line; and wherein the receiving slot is substantially orthogonal to the line.

9. The fluid sensor apparatus of claim 1, further comprising a processor in communication with the camera or photodetector, the processor determining a pH, an ammonia concentration, or combinations thereof, based on a temperature, a color of a pH sensing membrane and a color of an ammonia sensing membrane in the sensor card.

10. The fluid sensor apparatus of claim 9, the processor determining an intensity of green pixels in an image produced by the camera or photodetector.

11. The fluid sensor apparatus of claim 10, wherein the processor is housed within the pH and ammonia fluid sensor apparatus.

12. The fluid sensor apparatus of claim 1, wherein the sensor card comprises at least one fluid sensor membrane, a front carrier overlaying a front side of the at least one fluid sensor membrane, a back carrier overlaying a back side of the at least one fluid sensor membrane, and at least one pair of sampling holes positioned oppositely on the front carrier and back carrier, the pair of sampling holes aligned over the front side and back side of the fluid sensor membrane.

13. The fluid sensor apparatus of claim 2, further comprising a temperature sensor in the sampling chamber.

14. A dialysate flow path, comprising: the fluid sensor apparatus of claim 1, a dialyzer, a sorbent cartridge, and a dialysate pump.

15. The fluid sensor apparatus of claim 1, further comprising at least a second fluid inlet fluidly connectable to the fluid flow path.

* * * * *